Dec. 17, 1940.   J. J. N. VAN HAMERSVELD   2,224,887
MACHINE TOOL
Filed Feb. 20, 1939   10 Sheets-Sheet 2
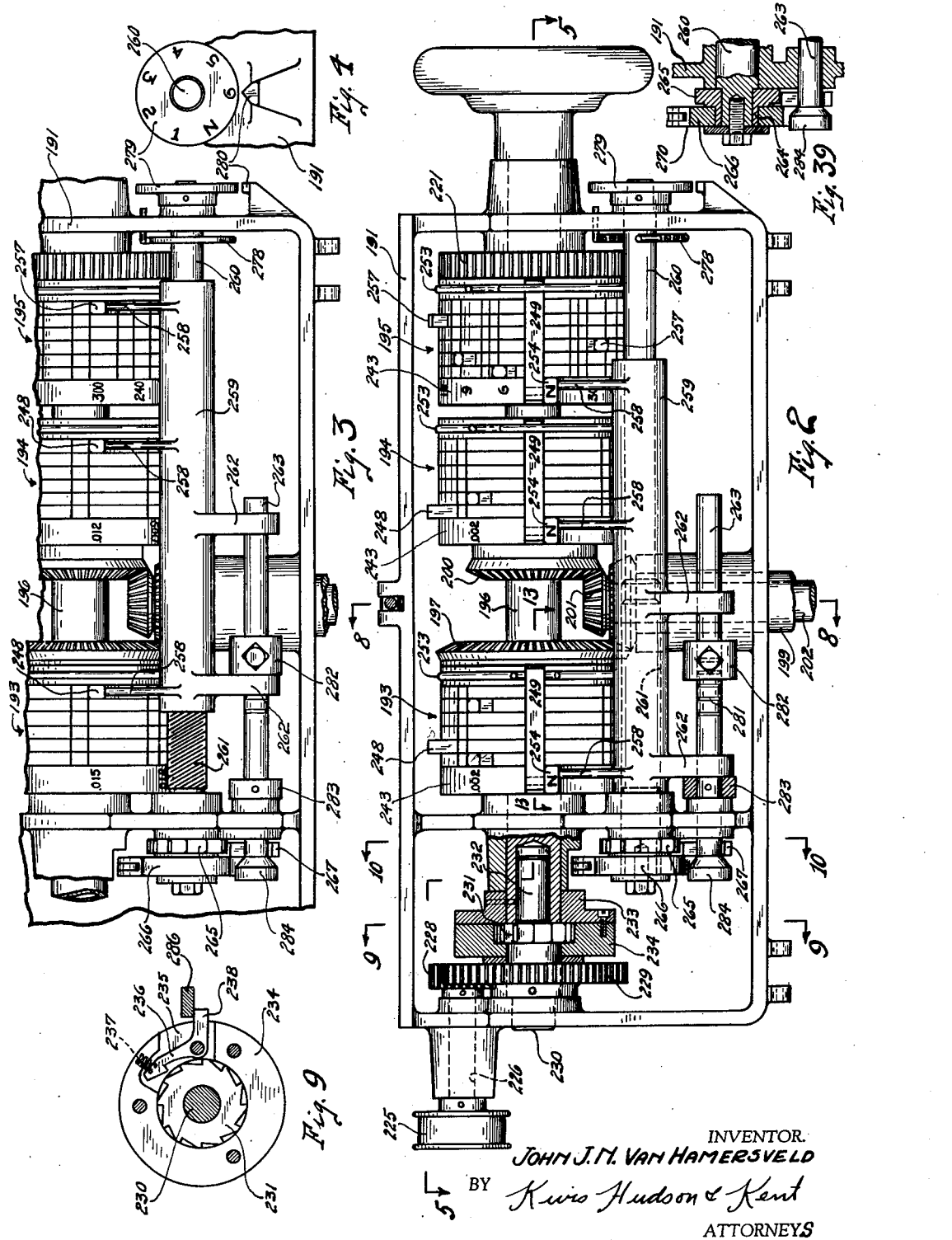
INVENTOR.
JOHN J. N. VAN HAMERSVELD
BY Kwis Hudson & Kent
ATTORNEYS

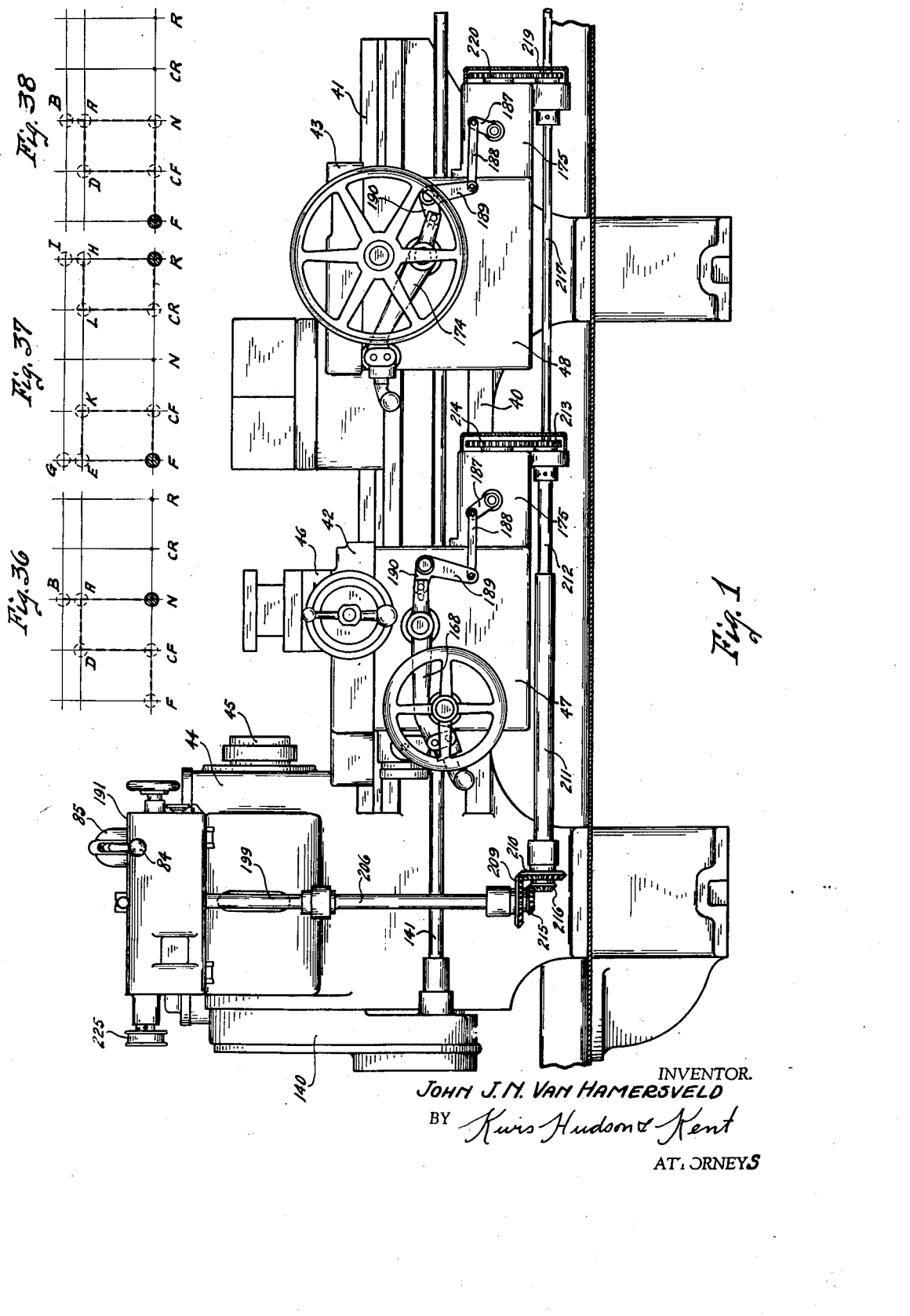

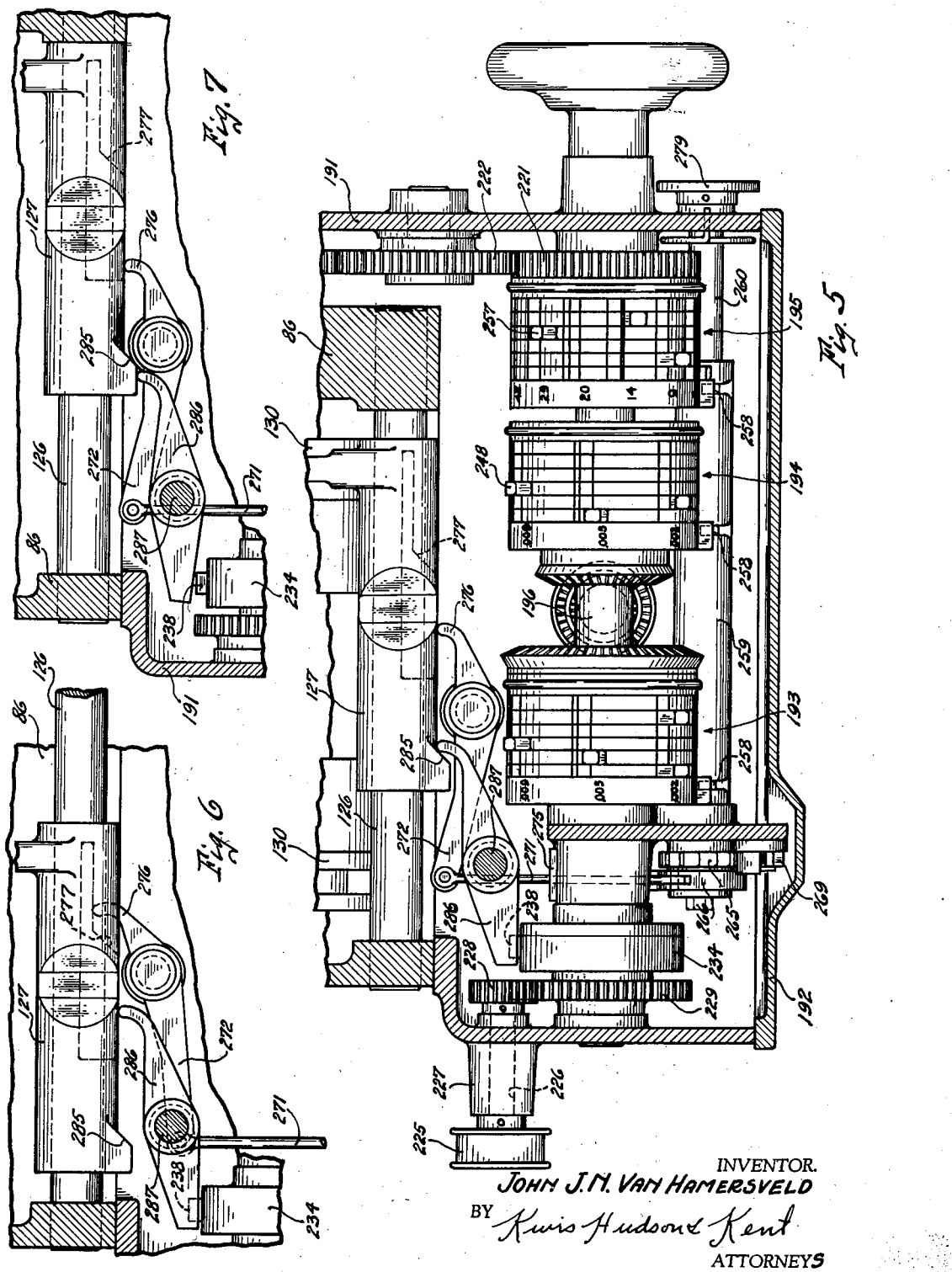

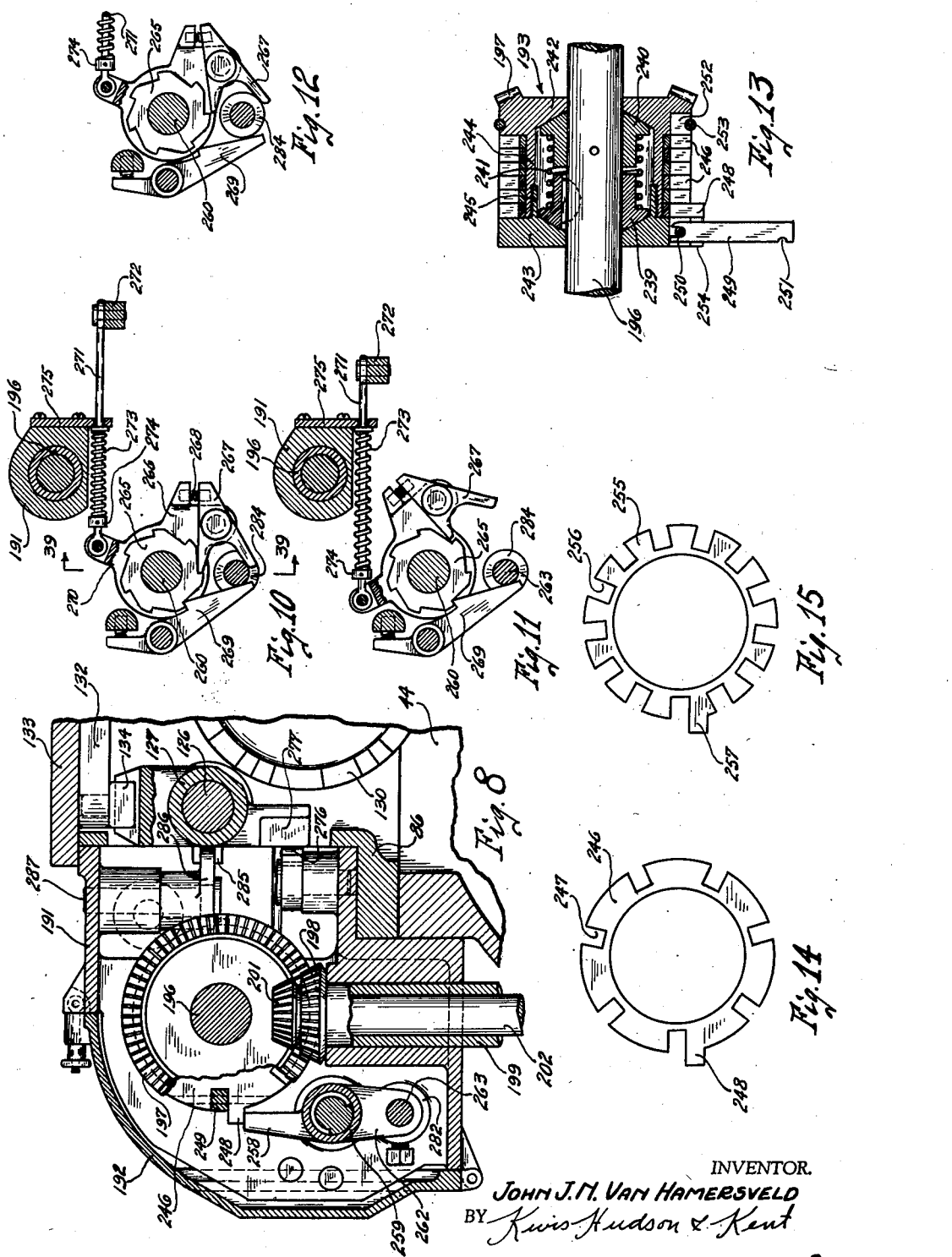

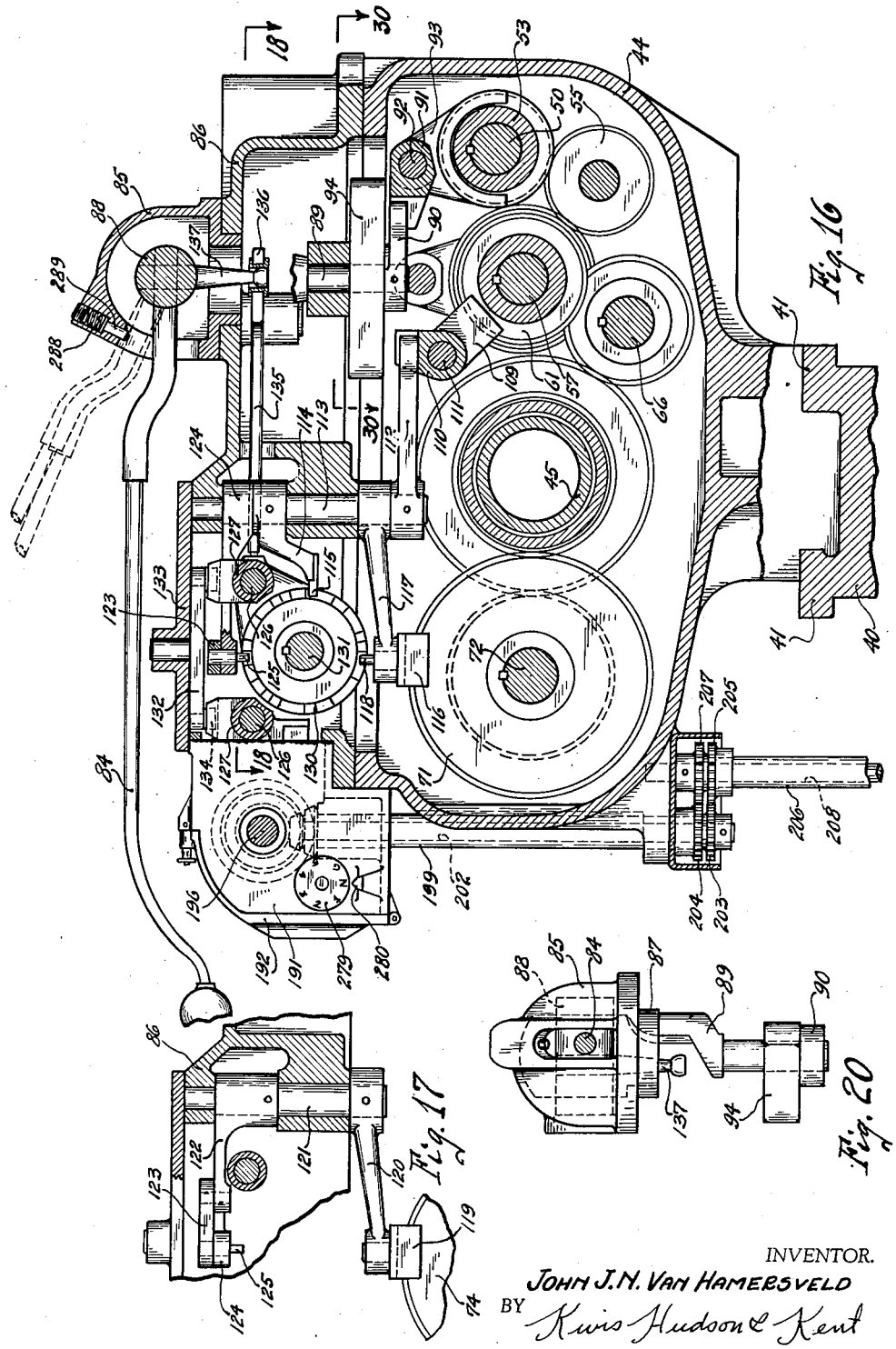

Dec. 17, 1940.   J. J. N. VAN HAMERSVELD   2,224,887
MACHINE TOOL
Filed Feb. 20, 1939   10 Sheets-Sheet 6
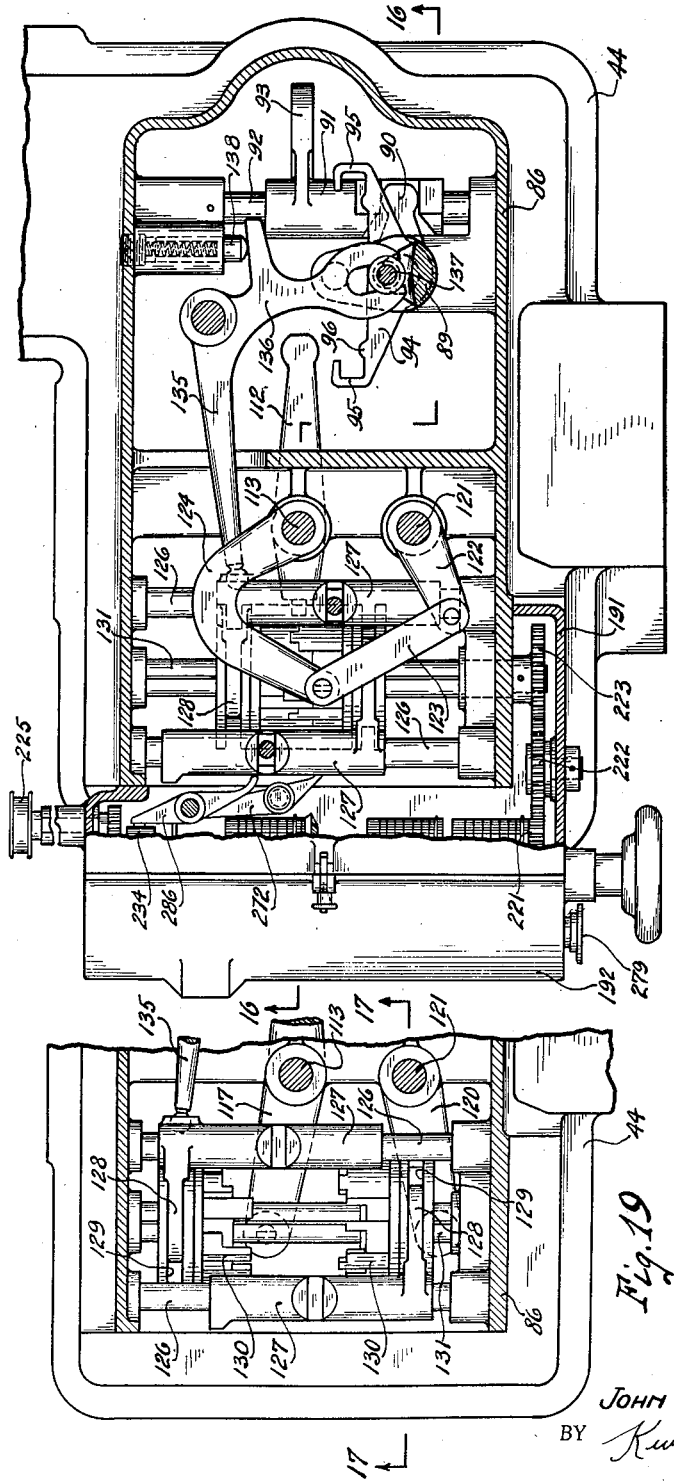
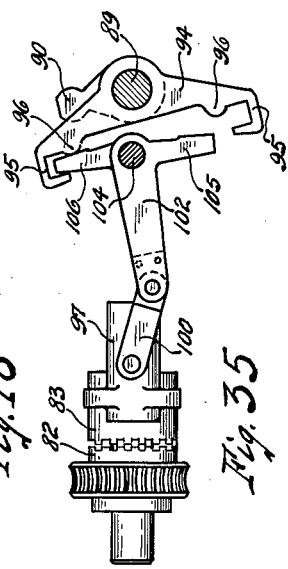
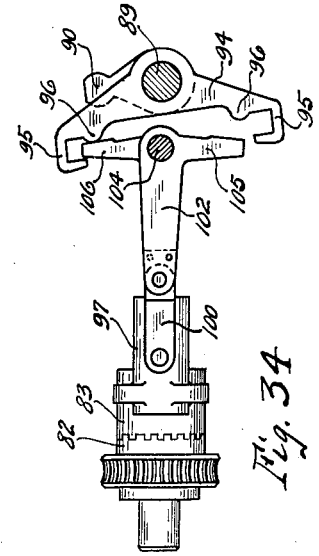
INVENTOR.
John J. N. Van Hamersveld
BY Kwis Hudson & Kent
ATTORNEYS

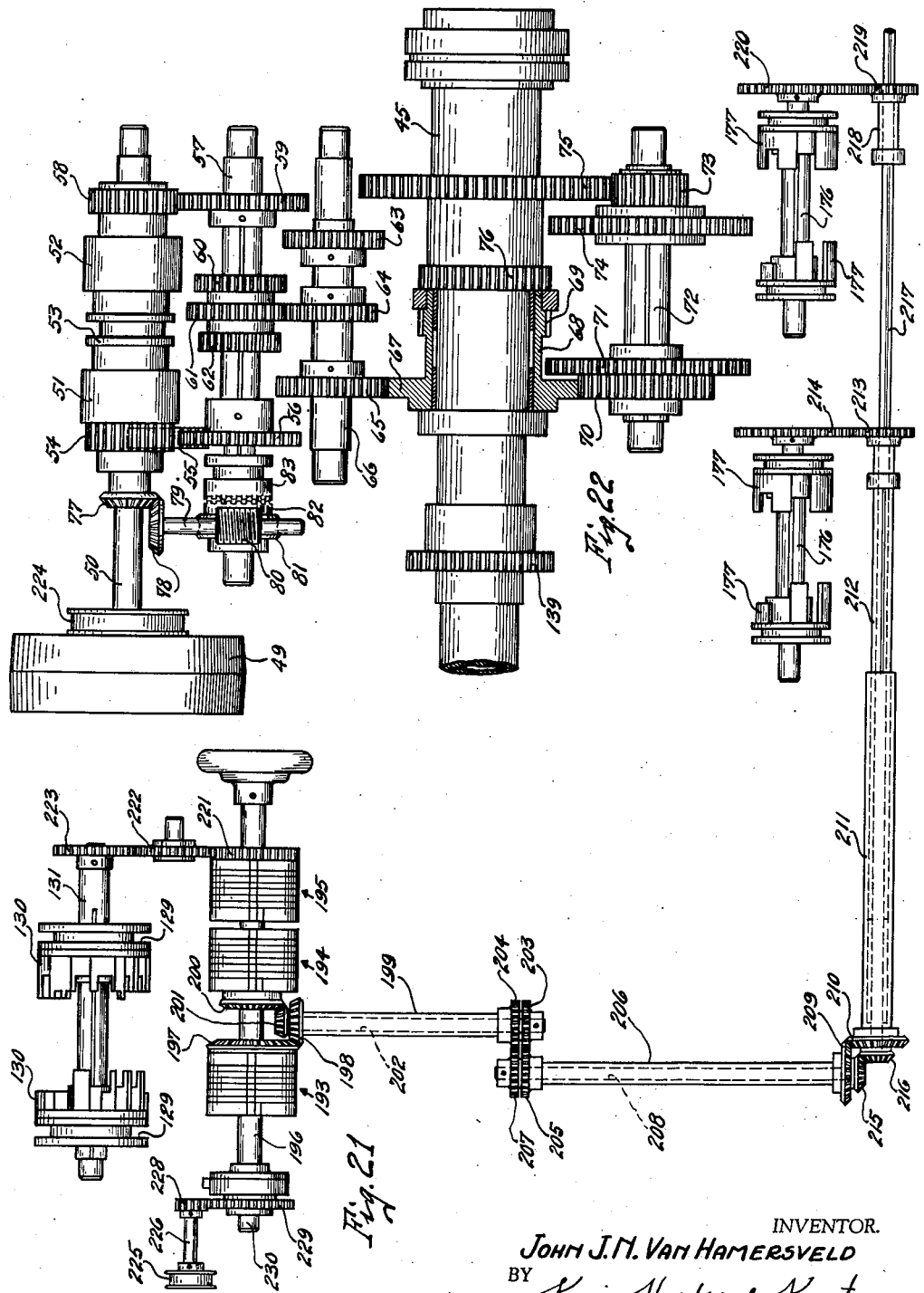

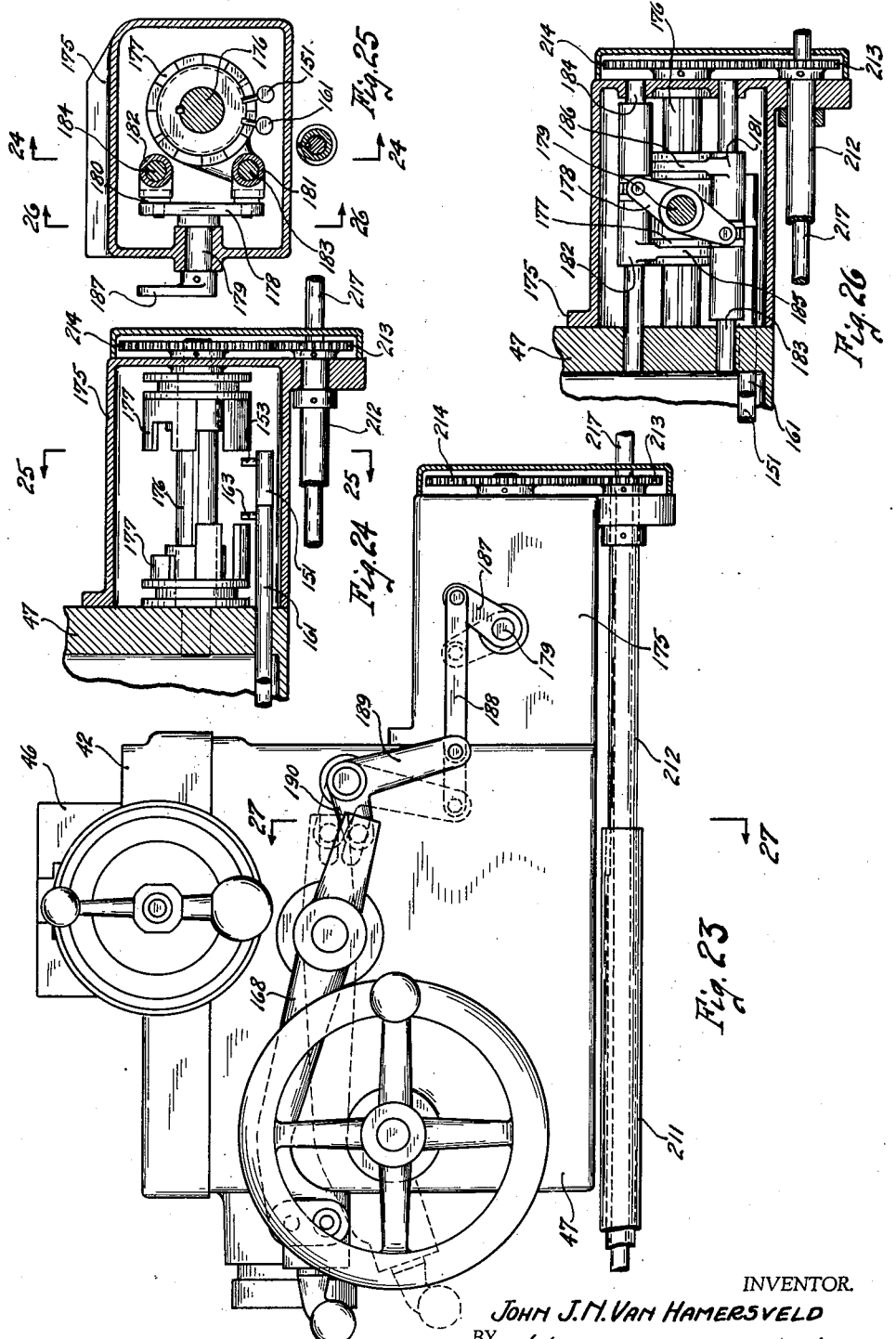

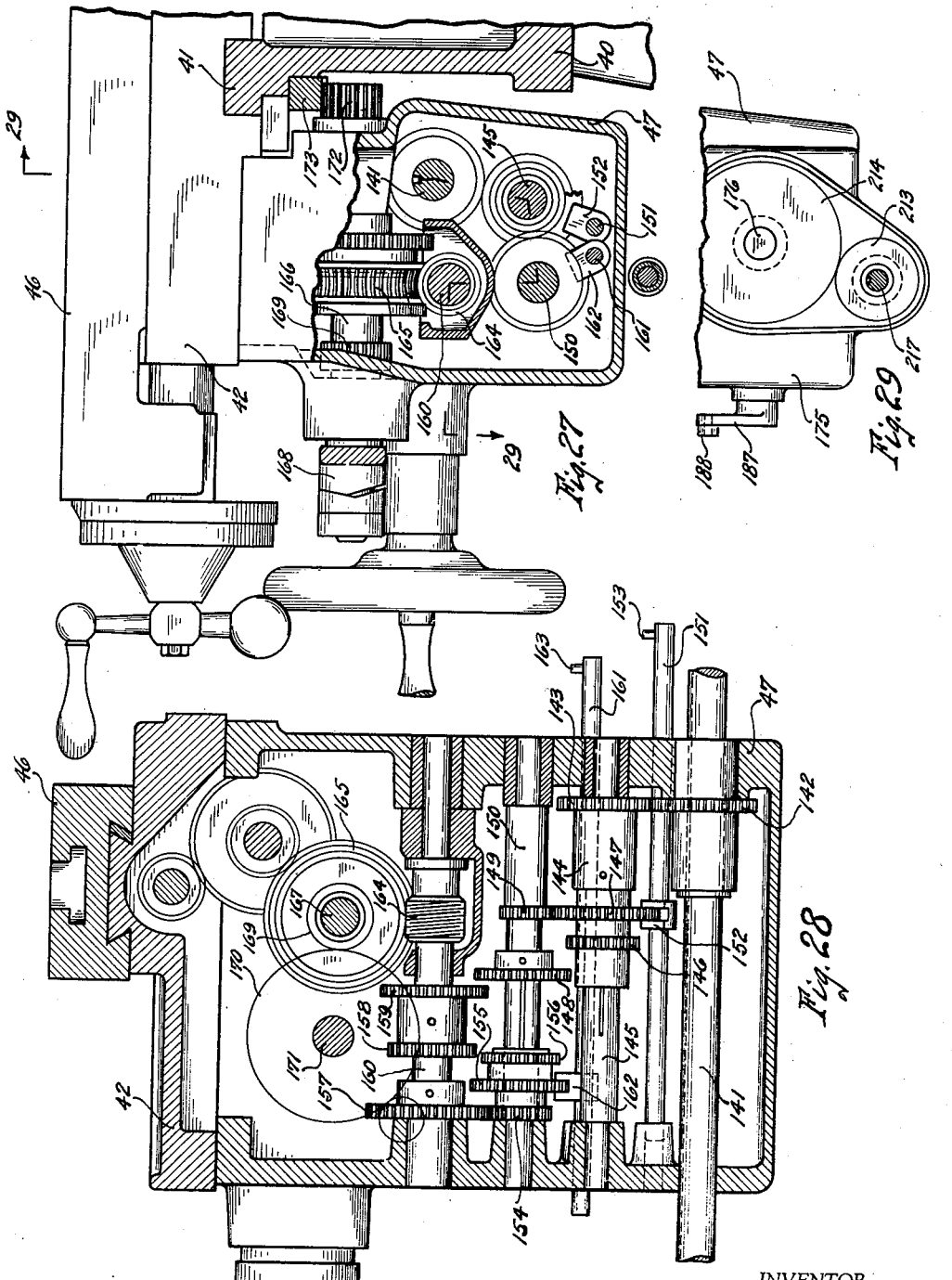

Dec. 17, 1940. J. J. N. VAN HAMERSVELD 2,224,887
MACHINE TOOL
Filed Feb. 20, 1939 10 Sheets-Sheet 10
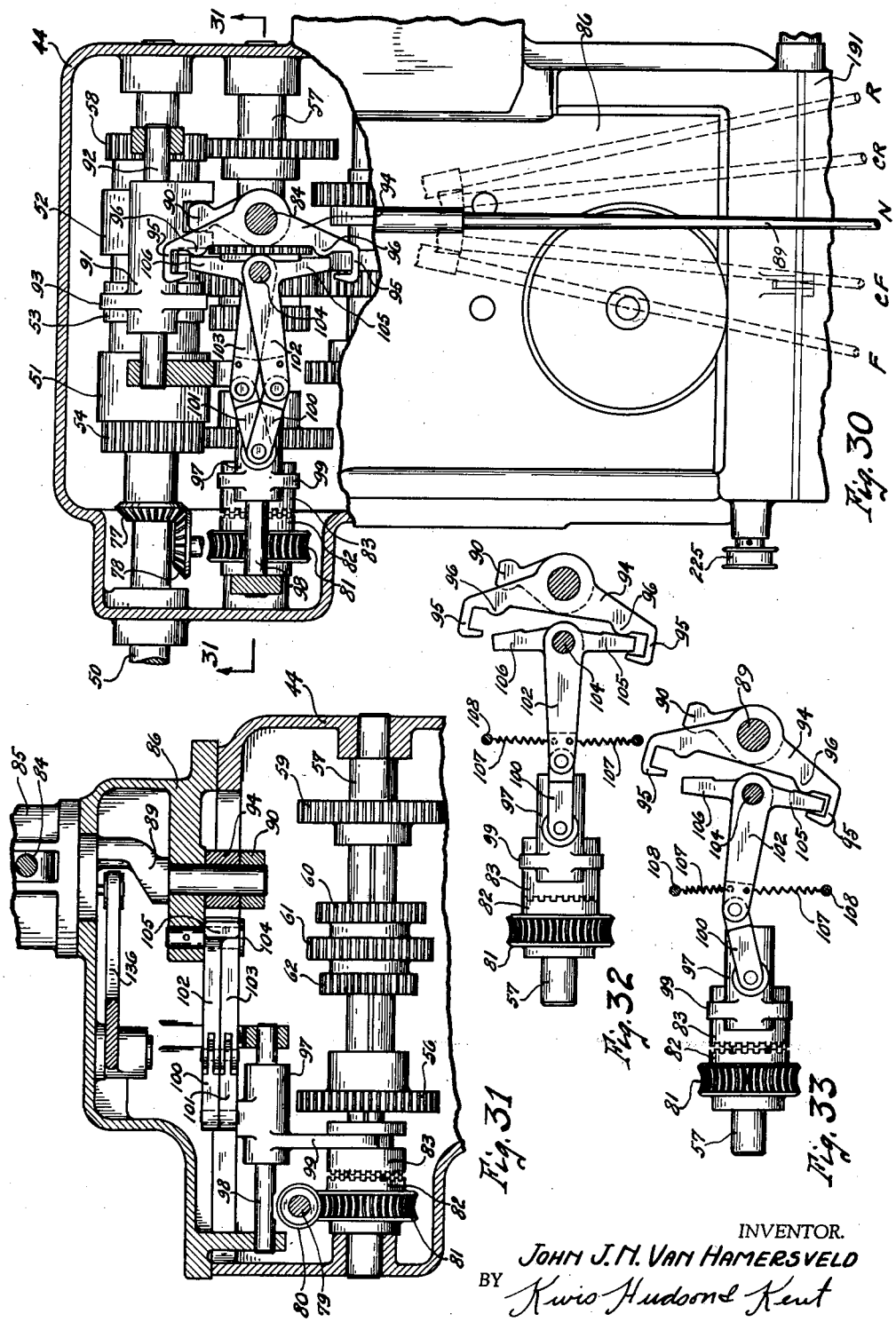
INVENTOR.
John J. N. Van Hamersveld
BY Kwis Hudson & Kent
ATTORNEYS Patented Dec. 17, 1940

2,224,887

UNITED STATES PATENT OFFICE 2,224,887

MACHINE TOOL

John J. N. Van Hamersveld, Cleveland Heights, Ohio, assignor to The Warner & Swasey Company, Cleveland, Ohio, a corporation of Ohio Application February 20, 1939, Serial No. 257,374

41 Claims. (Cl. 29—64)

This invention relates to a machine tool and more particularly to a centralized means for selecting or preselecting the rates of movement for the various movable parts of the machine tool, such as spindle speeds, the feeding movements of the slides, or the rates of movement of other movable parts of a machine tool.

An object of the invention is to provide a centralized means for selecting or preselecting the rates of movement for the various movable parts of a machine tool.

Another object is to provide in a machine tool a centralized means for selecting or preselecting the various changes in speed of a plurality of separate change speed transmissions each of which controls the rates of movement of a movable part of the machine tool.

A further object is to provide a centralized means for selecting or preselecting the rates of movement for a plurality of movable parts of a machine tool such as the spindle speeds and the rates of feeding movement for the slides, and wherein said means is power actuated upon the movement of a manually operated control member.

A still further object is to provide centralized means for selecting or preselecting the rates of movement for a plurality of movable parts of a machine tool such as the spindle speeds and the rates of feeding movement of the slides and wherein said means is power actuated and is controlled by the same control member which controls the engagement or disengagement of the main driving clutch.

Another object is to provide centralized means for selecting or preselecting the rates of movement of a plurality of movable parts of a machine tool such as the spindle speeds and the rates of feeding movement of the slides and wherein said means includes adjustable selecting members which can be positioned in a predetermined manner so as to effect the desired rate variations of the movable parts of the machine tool in each of the operative steps of a complete work cycle.

Another object is to provide centralized means for selecting or preselecting the rates of movement of a plurality of movable parts of a machine tool such as the spindle speeds and the rates of feeding movement of the slides and which means is operatively connected with the control means for the drives to the spindle and the slides and, in turn, is actuated upon the movement of a manually operable control member.

Another object is to provide in combination with the members for selecting or preselecting the spindle speeds and the rates of feeding movement of the slides of a machine tool a centralized selecting or preselecting device for said members and which when actuated simultaneously indexes said members so that the latter can effect, when actuated, a change to the selected or preselected spindle speed and rates of feeding movement for the slides.

Another object is to provide in a machine tool a centralized device such as specified in the last mentioned object and which device is power operated but is controlled by the control member which controls the main driving clutch.

A further and more general object is to provide in a machine tool a novel centralized device for selecting or preselecting the rates of movement of the movable parts of the machine tool, such as the spindle and slides, wherefore the operation of the machine tool by the operator is facilitated and simplified, thus increasing its efficiency of operation.

A still further object is to provide in a machine tool of the type having a headstock supporting a member movable at varying rates and provided with means for selecting or preselecting the different rates of movement of said member, a control device for said means and in the form of a unit attachment which can be applied to the headstock and operatively associated with said means.

Further and additional objects and advantages not hereinbefore referred to will become apparent hereinafter during the detailed description which is to follow of an embodiment of the invention.

Referring to the accompanying drawings,

Fig. 1 is a front elevational view of a machine tool embodying the present invention, with the pan and gear guards on the aprons shown in section.

Fig. 2 is a front view of the control device embodying the present invention with the cover of the container for said device removed and the parts of the device shown partly in elevation and partly in section.

Fig. 3 is a fragmentary view similar to Fig. 2 but with certain of the parts of the control device shown in different positions.

Fig. 4 is a fragmentary detail end elevational view of the container for the control device and is taken from the right hand side of Fig. 3 and shows a dial and pointer which indicates the setting of the mechanism of the control device in relation to the operative steps of a work cycle.

Fig. 5 is a horizontal sectional view through the control device and a portion of the head stock of the machine tool shown in Fig. 1 and is taken substantially on line 5—5 of Fig. 2 looking in the direction of the arrows.

Fig. 6 is a fragmentary view similar to Fig. 5 and shows certain of the parts in a different operative relation than that in which they are shown in Fig. 5.

Fig. 7 is a view similar to Fig. 6 but showing said certain operative parts in a still different relationship.

Fig. 8 is a transverse vertical sectional view through the control device and a portion of the head stock and is taken substantially on line 8—8 of Fig. 2 looking in the direction of the arrows.

Fig. 9 is a detail sectional view through the one rotation clutch of the control device and is taken on the plane 9—9 of Fig. 2 looking in the direction of the arrows.

Fig. 10 is a detail fragmentary view of the ratchet mechanism of the control device and is showing the parts thereof partly in section and partly in elevation, said view being taken on the line 10—10 of Fig. 2 looking in the direction of the arrows.

Fig. 11 is a view similar to Fig. 10 but showing the parts of the ratchet device in a different operative relationship.

Fig. 12 is a fragmentary view similar to Figs. 10 and 11 but showing the parts of the ratchet device in a still different operative relationship than that in which they are shown in either Fig. 10 or Fig. 11.

Fig. 13 is a detailed sectional view through one of the rotatable selecting units of the control device and is taken substantially on line 13—13 of Fig. 2 looking in the direction of the arrows, the said control device shown in said view controlling the selection or preselection of the rates of feeding movement for one of the slides.

Fig. 14 is a detached elevational view of one of the adjustable selector disks employed in the selector unit shown in Fig. 13.

Fig. 15 is a detached elevational view of one of the adjustable selector disks employed in the selector unit, which preselects or selects the spindle speeds.

Fig. 16 is a transverse vertical sectional view through the head stock of the machine tool shown in Fig. 1 and is taken substantially on irregular line 16—16 of Fig. 18 looking in the direction of the arrows.

Fig. 17 is a fragmentary sectional view through a portion of the control means in the head stock for selecting or preselecting the spindle speeds and is taken substantially on line 17—17 of Fig. 19 looking in the direction of the arrows.

Fig. 18 is a horizontal sectional view through the cover of the head stock and is taken substantially on line 18—18 of Fig. 16 looking in the direction of the arrows.

Fig. 19 is a fragmentary horizontal sectional view through the cover of the head stock and is taken below the plane of line 18—18 of Fig. 16 with the container for the control device removed.

Fig. 20 is a detached view of a part of the control lever mechanism.

Fig. 21 is a diagrammatic view showing the operative connections between the selector units of the control device and the various means for selecting or preselecting the spindle speeds and the rates of feeding movement of the slides.

Fig. 22 is a developed view of the change speed gearing in the head stock forming the drive transmission between the main drive shaft and the spindle.

Fig. 23 is a front elevational view of the cross slide carriage and apron, it being understood that the apron of the turret slide is substantially the same in construction.

Fig. 24 is a vertical longitudinal sectional view through the control device carried by the aprons for selecting or preselecting the rates of feeding movement for the slides and is taken substantially on line 24—24 of Fig. 25 looking in the direction of the arrows with the spool actuating mechanism removed.

Fig. 25 is a transverse sectional view through the control means shown in Fig. 24 and is taken substantially on line 25—25 of Fig. 24 looking in the direction of the arrows.

Fig. 26 is a vertical longitudinal sectional view through the control means shown in Fig. 25, being taken along line 26—26 of Fig. 25 looking in the direction of the arrows.

Fig. 27 is a view of the cross slide carriage and apron partly in end elevation and partly in section, the section being taken along line 27—27 of Fig. 23 looking in the direction of the arrows.

Fig. 28 is a fragmentary end elevational view of the housing for the control means for the gearing in the apron.

Fig. 29 is a vertical longitudinal sectional view through the apron and cross slide carriage and is taken substantially on irregular line 29—29 of Fig. 27 looking in the direction of the arrows.

Fig. 30 is a view of the head stock partly in top plan and partly in horizontal section, the section being taken on line 30—30 of Fig. 16 looking in the direction of the arrows, the various operative positions of the control lever being indicated by dash lines.

Fig. 31 is a vertical sectional view through the head stock and is taken substantially on line 31—31 of Fig. 30 looking in the direction of the arrows.

Figs. 32, 33, 34 and 35 are detached detail views illustrating the various positions of the parts of a portion of the mechanism shown in Fig. 30 in accordance with the dash line positions of the control lever.

Fig. 36 is a diagrammatic view illustrating the movements and different positions of the control lever when the speeds and feeds are preselected, starting from the neutral position of the control lever.

Fig. 37 is a view similar to Fig. 36 but illustrates the positions and movements of the control lever when the speeds and feeds are preselected prior to the completion of an operative step.

Fig. 38 is a view similar to Figs. 36 and 37 but illustrates the positions and movements of the control lever for selecting the speeds and feeds after the prior operative step in the work cycle has been fully completed.

Fig. 39 is a detached sectional view of a portion of Fig. 2 and shows the ratchet in the mechanism for moving the abutting arms.

In Fig. 1 there is illustrated in front elevation a turret lathe to which, by way of illustration, the invention is applied. The turret lathe comprises a bed 40, which is provided with ways 41 upon which slide the cross slide carriage 42 and the turret slide saddle 43 as is well understood.

At one end of the bed is the head stock 44 in which is rotatably mounted a work spindle 45 arranged in parallelism with the ways 41.

In order to clearly bring out the utility of the present invention it is believed to be preferable to describe first herein the drive transmission for the work spindle and the slide transmissions for the cross slide carriage 42 and cross slide and for the turret slide saddle 43. The cross slide is indicated at 46 and the cross slide apron at 47, while the apron for the turret saddle is indicated at 48.

Drive transmission for spindle

The drive transmission to the spindle will first be described with particular reference to Figs. 16, 22 and 30. The work spindle 45, as previously stated, is rotatably supported in the head stock 44 and is adapted to be driven at a plurality of speeds by means of the change speed gearing now to be described. The main drive pulley 49 is fixed to the main drive shaft 50 and said pulley can be connected to any suitable source of power. Freely rotatable on but fixed axially with respect to the drive shaft 50 in spaced relation are clutch members 51 and 52, while intermediate said clutch members there is a shiftable clutch member 53 that is splined to the shaft 50 to rotate therewith and move axially thereof. The clutch formed by the members 51, 52 and 53 is arranged so that the shiftable clutch member 53 can be moved a short distance from neutral toward either the member 51 or the member 52 before it comes into clutching engagement with said members for a purpose later to be explained. The clutch member 51 has formed thereon a gear 54 which meshes with an idler gear 55 that in turn meshes with a gear 56 fixed to a shaft 57. The clutch member 52 has formed thereon a gear 58 which constantly meshes with a gear 59 fixed to the shaft 57. It will be seen that the shaft 57 can be driven by the shaft 50 in either the forward or the reverse direction through the gearing just referred to and dependent upon the engagement of the main drive clutch.

A three step gear cone formed of the gears 60, 61 and 62 is splined on the shaft 57 intermediate the gears 56 and 59 for rotation therewith but movable axially thereof and the gears 60, 61 and 62 are adapted to mesh respectively with gears 63, 64 and 65 fixed to a shaft 66, from which it will be noted that the shaft 66 can be driven at any one of three speeds in either the forward or reverse directions. The gear 65 is constantly in mesh with a gear 67 formed on a sleeve 68 that is freely rotatable on the spindle 45 but held against axial movement thereon. The sleeve 68 is also provided with a gear 69 located adjacent the opposite end of the sleeve from the gear 67 and said gears 67 and 69 are adapted to mesh respectively with gears 70 and 71 of a rear two-step gear cone that is splined to a shaft 72 for rotation therewith and movement endwise thereof. It will be seen that the shaft 72 can be driven at any one of six speeds in either the forward or reverse directions.

The shaft 72 also has splined thereto a front two-step gear cone formed of the gears 73 and 74 with the gear 73 adapted to be brought into mesh with a gear 75 fixed to the spindle 45 with the gear 74 adapted to be intermeshed with a gear 76 also fixed to the spindle, wherefore it will be seen that the spindle 45 can be driven at any one of twelve speeds in either the forward or reverse directions.

In order to facilitate the shifting of the gearing mechanism is provided whereby the shaft 57 can be driven from the shaft 50 at a considerably slower speed, which mechanism is clearly illustrated in my copending application Serial No. 214,036, filed June 16, 1938, now Patent No. 2,169,749, issued August 15, 1939. A bevel gear 77 is fixed to the shaft 50 and meshes with another bevel gear 78 fixed to a short shaft 79 that is rotatably supported in the head stock. The shaft 79 has fixed therto intermediate its ends a worm 80 that meshes with a worm wheel 81 mounted on or formed integral with a clutch member 82 that is freely rotatable on the shaft 57 but held against axial movement, see Figs. 22 and 31. A shiftable clutch member 83 is splined to the shaft for movement endwise thereof and for rotation therewith. The clutch members 82 and 83 constitute an auxiliary clutch and are provided on their adjacent faces with clutch teeth, wherefore when said teeth are engaged by shifting the clutch member 83 toward the clutch member 82 a relatively slow drive will be imparted from the shaft 50 to the shaft 57 through the gearing 77, 78, 80 and 81 and also to the change speed gearing of the transmission in the head stock which has been previously described. It will be understood that a different form of clutch mechanism might be employed in place of the positive clutch formed by the members 82 and 83, as for example, a friction clutch.

The main driving clutch on the shaft 50 and the auxiliary shaft formed of the members 82 and 83 on the shaft 57 are controlled by a control mechanism which includes a single manually operated control member and said mechanism is so arranged that, when said control member is in the neutral position, both clutches are disengaged, but when it is in either of its operative positions only the main driving clutch is engaged, the auxiliary clutch at this time being disengaged. The control mechanism is so constructed that when the control member is in a predetermined position intermediate neutral and either of its operative positions, the main drive clutch will be disengaged but the auxiliary clutch will be engaged and thus a slow power drive will at this time be imparted to the change speed gearing, wherefore the shifting of the gear cones in the drive transmission to the spindle will be facilitated.

The main control lever is indicated at 84 and extends over the top of the head stock from the front of the machine toward the rear thereof in such position as to be within convenient reach of the operator. The rear end of the control lever extends into a dome-shaped housing 85 that is swivelly mounted in the cover 86 of the head stock by means of an integral bearing portion 87 that fits an opening formed in the cover 86, see Figs. 16 and 20. The housing 85 is provided with a transverse bore in which is rockably mounted a cylindrical member 88 to which the rear end of the control lever 84 is secured, so that the control lever can be rocked relative to the housing 85 in a vertical direction for a purpose later to be explained. Extending downwardly from the bearing portion 87 and integral therewith is a shaft 89 that is rockably supported in a boss formed in the cover 86 and has at its lower end a lever arm 90. It will be seen that when the control lever 84 is moved in a horizontal plane, as viewed in Fig. 16, the housing 85 and the shaft 89 and lever arm 90 will rock about the axis of the bearing portion 87.

The lever arm 90 has its outer or free end rounded and extending into a slot formed in a sleeve 91 that is slidably supported on a rod 92 carried by downward extensions formed on the underside of the cover 86, see Fig. 18. The sleeve 91 is provided with an integral downwardly extending yoke 93 that straddles the groove in the shiftable clutch member 53 of the main driving clutch, see Figs. 16, 18 and 30, wherefore it will be seen that when the shaft 89 is rocked by moving the control lever 84 in a horizontal direction from full line position N of Fig. 30 to the dash line positions F or R, said clutch member 53 will be moved from a neutral position into engagement with the clutch members 51 and 52 as the case may be to impart a forward or reverse rotation to the change speed gearing and spindle 45.

Secured to the shaft 89 above the lever arm 90 is a double armed lever 94, the opposite ends of which are in the form of hooks 95, while inwardly of said opposite ends the lever 94 is provided with rounded abutting protuberances 96 for a purpose later to become apparent. A sleeve 97 slidable on a rod 98 carried by downwardly extending projections on the underside of the cover 86 is provided with an integral yoke 99 that straddles the groove in the member 83 of the auxiliary clutch (see Figs. 30 and 31) wherefore it will be seen that movement of the sleeve 97 endwise on the rod 98 effects an endwise movement of the clutch member 83 to bring its clutch teeth into or out of engagement with the clutch teeth of the member 82. The sleeve 97 on its upper side is provided with a bearing pin on which are pivotally mounted links 100 and 101 of a double toggle mechanism formed of the links and the arms 102 and 103 of bell crank levers which are pivotally mounted on a downwardly extending bearing pin 104 carried by the cover 86. The other arms of the bell crank levers, namely, arms 105 and 106 are integral with the arms 102 and 103, respectively, and project from the bearing pin 104 in opposite directions, as clearly shown in Figs. 30, 32, 33, 34 and 35. It will be understood, of course, that the adjacent ends of the links 100, 101 and the arms 102 and 103 are pivotally connected together as is usual in toggle mechanisms. The arms 102 and 103 adjacent to their pivotal connections to the links 100 and 101 have secured thereto one end of extensible springs 107, the opposite ends of which are secured to pins 108 carried by the cover of the head stock.

When the control lever 84 is in the full line position N of Fig. 30, the main driving clutch member 51 on the shaft 50 and the auxiliary clutch on the shaft 57 formed of the clutch members 82, 83 are both in the disengaged or neutral position and the parts of the control mechanism for said clutches are in the position indicated in Figs. 22 and 30. It will be noted that at this time the outer ends of the arms 105, 106 of the bell crank levers which form part of the toggle mechanism connected to the sleeve 97 are in engagement with the rounded abutting protuberances 96 on the double lever arm 94. When the double lever arm 94 is in the position shown in Fig. 30 the springs 107 acting on the arms 102, 103 of the toggle mechanism pull said arms outwardly, and consequently the links 100, 101 as shown in Fig. 30, at which time, of course, the sleeve 97 and the clutch member 83 are moved toward the right, as viewed in the drawings, and the teeth of said clutch member and clutch member 82 are disengaged.

Assuming that it is desired to shift the gear cones in the drive transmission to obtain a certain spindle speed and commence the operation of the machine, the operator moves the main control lever 84 from position N, i. e., neutral position of Fig. 30, to dash line position CF. This movement of the control lever rocks the lever 90 in a clockwise direction to cause a movement of the shiftable clutch member 53 toward the clutch member 52, but it will be remembered that an idling movement is arranged for in the main driving clutch such that the movable clutch member 53 at this time will not yet be brought into driving engagement with the clutch member 52.

The said movement of the control lever 84 also effects a rocking movement of the double lever arm 94 from the position shown in Fig. 30 to the position shown in Fig. 32. During this movement of the double lever arm 94 the arm 105 of the upper bell crank of the toggle mechanism has been moved by the protuberance 96 until the link 100 and arm 102 of the upper toggle mechanism lie in straight alignment with each other, as indicated in Fig. 32, at which time the lower hook 95 (as viewed in the drawings) of the arm 94 has passed behind or straddles the end of the arm 105. This positioning of the link 100 and arm 102 of the upper toggle causes the sleeve 97 to be moved toward the left, as viewed in the drawing, to thus effect an engagement of the clutch teeth of the clutch member 83 with the clutch teeth on the clutch member 82, as clearly indicated in Fig. 32, at which time a slow power drive will be imparted to the change speed gearing through the gearing 77, 78, 80 and 81 and shaft 57. It will be understood that the movement toward the left of the sleeve 97 upon the straightening of the toggle 100, 102 effects a corresponding straightening of the lower toggle 101, 103, since said toggles are connected to the sleeve 97, wherefore both springs 107 are equally extended. At this time, as previously stated, a slow power drive is being imparted to the change speed gearing such that the shiftable gear cones thereof can be shifted and meshed without clashing by a mechanism later to be described.

After the shiftable gear cones have been shifted the operator will then move the control lever 84 from dash line position CF of Fig. 30 to dash line position F thereof, which movement effects a further clockwise rocking movement of the double lever arm 94 that is from the position shown in Fig. 32 to the position shown in Fig. 33. This further movement of the double lever arm 94 results in a further clockwise rocking movement to the upper bell crank lever of the toggle mechanism such that the link 100 and arm 102 are moved out of alignment and into an angularly disposed position opposite to their position as shown in Fig. 30, that is, into the position shown in Fig. 33. This movement of the link 100 and arm 102 of the toggle causes the sleeve 97 to be positively moved toward the right, as viewed in the drawing, to effect a disengagement of the clutch teeth of the clutch members 82, 83, it being understood that the spring 107 connected to the arm 103 of the lower toggle causes the link 101 and arm 103 of said toggle to move into their normal inactive position, i. e., the position of Fig. 30 and to lie directly below the link 100 and arm 102.

The parts are so arranged that the disengagement of the teeth of the clutch members 82, 83 takes place just prior to the control lever 84 reaching position F and the further slight movement necessary to bring control lever 84 completely into position F results in the lever 90 having been rocked sufficiently far in the clockwise direction to bring the clutch member 53 into driving engagement with the clutch member 52, whereupon the change speed gearing will be driven at a normal driving rate and the spindle will be rotated at the desired speed.

When it is desired to stop the rotation of the spindle, the main clutch is first disengaged and then the auxiliary clutch is momentarily engaged with the parts in the position shown in Fig. 32, after which the auxiliary clutch is disengaged by the time the control lever reaches position N and the parts are in the relationship shown in Fig. 30.

When the control lever 84 is moved in a direction to obtain reverse rotation of the gearing and spindle, the lower toggle mechanism formed of the link 101, arm 103 functions to move the sleeve 97. When the control lever moves from full line position N of Fig. 30 to dash line position CR, the parts of the toggle mechanism are as indicated in Fig. 34, and when the control lever is moved from dash line position CR to dash line position R, the parts are in the relationship indicated in Fig. 35. As previously stated herein, a friction clutch might be employed instead of the positive auxiliary clutch shown herein, and such use of a friction clutch would probably be preferable for high speed ranges.

The three shiftable gear cones in the drive transmission are shifted by the mechanism now to be described. The three step gear cone on the shaft 57 is shifted by means of a yoke 109 that straddles the gear 61 and which yoke is formed integral with a sleeve 110 slidably mounted on a rod 111 carried by the head stock, see Fig. 16. The upper side of the sleeve 110 is provided with a slot into which extends the rounded end of a lever arm 112 that has its opposite end fixed to the lower end of a vertically extending shaft 113 that is rockably mounted in a bearing boss formed on the cover 86. A second lever arm 114 is fixed to the shaft 113 above the bearing boss and this second arm is provided at its free end with a pin 115.

The rear two-step gear cone on the shaft 72 is shifted by means of a shoe 116 that straddles the large gear 71 and is pivotally carried by the outer end of a lever 117 the opposite end of which is freely rockable on the shaft 113 intermediate the lever arm 112 and the lower end of the bearing boss supporting the shaft 113. A pin 118 formed integral with the shoe 116 projects upwardly above the lever 117.

The front two-step gear cone on the shaft 72 is shifted by means of a shoe 119 that straddles the large gear 74 and is pivotally carried by the outer end of a lever arm 120 fixed to the lower end of a vertical shaft 121 that is rockably mounted in a bearing boss formed in the cover 86, see Fig. 17. The shaft 121 adjacent its upper end has fixed thereto a lever arm 122 which, in turn, is pivotally connected at its outer end to one end of a link 123. The opposite end of the link 123 is pivotally connected to a bent lever arm 124 that is freely rotatable on the shaft 113 intermediate the lever 114 and the underside of a boss on the cover 86, see Figs. 16, 17 and 18. The underside of the bent lever arm 124 at its point of pivotal connection with the link 123 is provided with a downwardly extending pin 125, which pin may be integral with the pivot pin connecting the link 123 and the arm 124.

It will be seen that when the pins 115, 118 and 125 are moved, through the lever arms and shafts hereinabove described, the gear cones will be shifted. In order to effect predetermined movements of the pins 115, 118 and 125 and a resultant predetermined shifting of the gear cones, the following mechanism is employed.

The cover 86 of the head stock is provided with a pair of fixed horizontally extending and parallel rods 126 on which are slidably mounted sleeves 127. These sleeves are each provided with integral yokes 128 that engage in annular grooves 129 formed on a pair of spools 130 which are splined to a rotatable shaft 131 mounted in the cover so that the spools 130 are capable of movement axially of the shaft 131 and of rotation therewith, see Figs. 18 and 19. The shaft 131 could be rotated directly by a hand wheel (not shown) fixed on its outer end as will be readily understood, but it is shown and described herein as rotated by means of gearing later to be referred to and which operatively connects the shaft with the centralized control embodying the present invention. The adjacent faces of the spools 130 are provided with a series of cooperating long and short projections, short and long projections and projections of equal length for a purpose which will later become clear. The sleeves 127 on the rods 126 are interconnected by means of a rockable equalizer bar 132 that is mounted on the underside of a bearing plate 133 carried by the cover 86, see Fig. 16. The opposite ends of the equalizer bar 132 are provided with pivoted shoes 134 extending into transverse slots formed in the sleeves 127. It will be seen that when one of the sleeves 127 is moved endwise on its rod 126 the other sleeve 127 will have an equalized movement on its rod 126 but in the opposite direction and that such movements of the sleeves will effect an equalized endwise movement of the spools 130 toward or away from each other on the shaft 131. The right hand sleeve 127, as viewed in Figs. 16 and 18, is provided with a socket into which extends a ball formed on the end of the arm 135 of a bell crank lever that is rockably mounted on a bearing pin carried by the cover 86. The other arm of said bell crank indicated at 136 has at its outer end a fork portion provided with a bushing in which is arranged a ball portion formed in the lower end of a vertically extending lever arm 137 secured to the cylindrical member 88 to which the control lever 84 is connected. It will be seen that when the control lever 84 is moved in a vertical plane to rock the member 88 about its axis, such movement will cause, through the lever arm 137, a rocking movement to be imparted to the bell crank lever, and through the arm 135 thereof an endwise movement to the sleeves 127 and to the spools 130. In order to retain the control lever 84 in the upward position when the operator moves the same from the full line position in Fig. 16 to the dash line position O thereof, as indicated in Fig. 16, and to counter-balance the weight of said lever a spring plunger 138 acts on a laterally projecting portion of the arm 136 of the bell crank, as clearly shown in Fig. 18, wherefore the lever will remain in any position to which it has been moved. The pins 115, 118 and 125 are so located that they lie between the ends of the series of projections on the adjacent faces of the spools 130. It will be seen that when the shaft 131 is rotated the spools 130 will be indexed and consequently different pairs of cooperating projections will be positioned in alignment with the various pins. The spools 130 can be indexed when they are separated sufficiently far so that the projections on their adjacent faces do not interfere. At this time the control lever will be in the lower dash line position of Fig. 16.

It will be seen that when the operator moves the control lever 84 from the lower dash line position to the full line position of Fig. 16 the spools 130 will move axially of the shaft 131 toward each other with an equalized movement and that certain of the cooperating pairs of projections will engage one or more of the pins 115, 118 and 125 to cause one or more of the gear cones to be shifted in a predetermined manner.

Drive transmission for feeds

The feed train for the cross slide carriage and cross slide will now be described, it being understood that the gearing for the feeding movement for the turret saddle is substantially the same as for the cross slide carriage. The spindle 45 has fixed thereto a gear 139 which through a gear train arranged in a gear box 140 on the head stock, as is well known in the art, drives a feed shaft 141 that extends longitudinally of the front of the bed of the machine and parallel to the ways 41, and is operatively connected with the gearing in the apron 47 of the cross slide carriage 42. Inasmuch as the feed train in the apron 48 of the turret saddle 43 is a substantial duplicate of the feed train in the apron 47 of the cross slide carriage 42 when the power feed drive for the cross slide is omitted, it will only be necessary to explain herein in detail the feed train in the apron of the cross slide carriage and for this purpose reference may be had particularly to Figs. 27 and 29.

The feed shaft 141 has a splined connection with a rotatable gear sleeve mounted in the apron against endwise movement as is well known in the art and carrying a gear 142. The gear 142 meshes directly with a gear 143 on a sleeve 144 that is fixed to a shaft 145 rotatably mounted in the apron. A shiftable two-step gear cone is splined on the shaft 145 and is composed of the gears 146 and 147 which are adapted, when the gear cone is shifted to one or the other of its two operative positions, to mesh with gears 148 and 149, respectively, that are fixed to a shaft 150, wherefore it will be seen that the shaft 150 can be driven from the shafts 141 and 145 at either one of two speeds. The two-step gear cone can be shifted by means of a sliding rod 151 that is provided with a shoe 152 straddling the gear 147 while said rod 151 projects beyond the right hand end of the apron as viewed in the drawings and is provided at its outer end with a pin 153 for a purpose later to become apparent. A shiftable three-step gear cone is splined on the shaft 150 and is formed of the gears 154, 155 and 156 which can be intermeshed, respectively, with gears 157, 158 and 159 fixed to a shaft 160. The three-step gear cone is shifted by means of a slidable rod 161 that is provided with a shoe 162 straddling the gear 155 and which rod projects beyond the right hand end of the apron, as viewed in Fig. 29, and is provided at its outer end with a pin 163 for a purpose later to be explained. It will be seen that the shaft 160 can be driven at any one of six different speeds, as is well understood in the art.

A worm 164 meshes with a worm wheel 165 that constitutes the outer member of a friction cone clutch, the inner member of which is integral with a sleeve 166. A control lever 168 is mounted on the front side of the apron and through the intermediary of suitable camming means controls the endwise movement of the sleeve 166 to effect an engagement or disengagement of the friction clutch as is well known in the art and which therefore need not be explained in detail. A pinion 169 is fixed on the sleeve 166 and meshes with a gear 170 fixed on a shaft 171 extending transversely of the apron and projecting from the rear side thereof and having on its projecting end an integral pinion 172 meshing with a longitudinally extending rack 173 fixed to the bed, wherefore it will be seen that rotation of the shaft 171 and pinion 172 will effect a longitudinal feeding movement of the cross slide carriage along the ways 41 of the bed as is well understood in the art.

It will be understood, since it is well known in the art, that the power feed drive for the cross slide is derived from the shaft 167 through suitable gearing, and consequently need not be described herein in detail as it is clearly shown in my copending application Serial No. 182,104, filed December 28, 1937, now Patent No. 2,169,748, issued August 15, 1939.

When the control lever 168 is in the raised or full line position of Fig. 23 the friction clutch on the shaft 167 is engaged and power feeding movement is being imparted to the cross slide carriage. When the lever 168 is in the lower or dash line position of Fig. 23 the friction clutch on the shaft 167 is disengaged and the feed drive to the cross slide carriage is interrupted. The control lever 168 is manually raised to its clutch engaging position and held therein until it is either manually or automatically disengaged by means well known in the art, such for example, the means shown in my said Patent No. 2,169,748.

As previously stated, similar gearing is arranged in the apron 48 of the turret saddle and the shiftable gear cones of the gear trains in both the saddles 47 and 48 are shifted by the mechanism now to be described and which is fully illustrated and described in my said Patent No. 2,169,748. It will also be understood that there is a friction clutch in the feed train in the apron 48 similar to the friction clutch in the apron 47 and that the engagement and disengagement of such clutch is controlled by a control lever 174 similar to the control lever 168.

As previously explained, the shiftable gear cones forming part of the power feed train in the apron 47 are shifted by means of the slidable rods 151 and 161 which project beyond the end wall of the apron into a housing 175 mounted on said end wall, as clearly shown in Figs. 1, 23 and 24. Rotatably mounted in the housing 175 and in the end wall of the apron is a shaft 176 which has splined thereto for endwise movement thereon and rotation therewith a pair of spools 177, which spools on their adjacent faces are provided with cooperating series of long and short projections, short and long projections and projections of equal length similar to the spools 130 in the head stock, except that the number of cooperating pairs of projections on the spools 177 is less than on the spools 130 due to the fact that, in this instance, only six different rates of feeding movements are imparted to the cross slide carriage, whereas twelve different speeds are imparted to the work spindle. The pairs of projections on the spools 177 cooperate with the pins 153 and 163 carried by the rods 151 and 161, respectively, which pins are located between the adjacent faces of the spools 177 as clearly shown in Fig. 24.

It will be seen that when the shaft 176 is rotated the spools 177 will be indexed to position the cooperating pairs of projections in predetermined relationship. The means for indexing the spools 177 will be referred to hereinafter. As described in connection with the spools 130, it will be understood that when the same have been indexed and are then moved endwise toward each other, the cooperating projections engage with one or both of the pins 153 and 163 to shift the same and the rods 151 and 161 to shift the two-step gear cone and/or the three-step gear cone as the case may be to effect a change in the feed train to the cross slide carriage.

The spools 177 are moved linearly toward and away from each other with an equalized movement by means of an equalizer bar 178 fixed on a stub shaft 179 that is rotatably mounted in a bearing boss formed in the front wall of the housing 175, see Fig. 25.

The equalizer bar 178 carries adjacent its opposite ends pivoted shoes 180 which are located in slots formed in elongated slidable sleeves 181, 182 mounted on rods 183 and 184 which are supported in the housing 175 and in the end wall of the apron. The sleeve 181 is provided at its left hand end, as viewed in Fig. 26, with an integral yoke 185 that straddles a groove in the left hand spool 177, while the sleeve 182 is provided at its right hand end with a similar yoke 186 that straddles a similar groove in the right hand spool 177.

It will be seen that rotation of the shaft 179 will impart a rocking movement to the equalizer bar 178 and this movement, in turn, will cause an equalized linear movement of the sleeves 181 and 182 and also of the spools 177. The stub shaft 179 has fixed to its outer end exteriorly of the housing 175 a short lever arm 187 that has its outer end pivotally connected to one end of a link 188, the opposite end of which is pivotally connected to the free end of the arm 189 of a bell crank lever that is rockably supported on the front face of the apron, see Fig. 23. The arm 190 of said bell crank lever is provided with a roller that engages in a slot formed in an extension of the control lever 168, wherefore it will be seen that the raising and lowering movements of the control lever 168 will effect a rocking movement of the bell crank lever and through the link 188 and lever arm 187 a rocking movement of the stub shaft 179 to move the spools linearly outwardly or inwardly toward each other. The apron 48 of the turret saddle is provided with mechanism similar to that just described for the purpose of shifting the gear cones in the feed train to the saddle and inasmuch as it is a mere duplication need not be described herein, it being noted by reference to Fig. 1 that the housing for the spools and the lever system for moving the spools inwardly and outwardly are designated by the same reference characters as the corresponding parts in the apron.

*Centralized control*

The centralized means for selecting or preselecting the spindle speeds and the rates of feeding movements of the cross slide and the turret saddle will now be described. The centralized means for selecting or preselecting the spindle speeds and the rates of feeding movements of the cross slide carriage and turret saddle is housed in a container 191 that is fastened by suitable means to the front of the head stock and is provided with an open rear side communicating with an opening in the head stock. The centralized control therefor can be designated as a unit attachment applicable to and removable from the headstock as such. The container 191 is provided on its front side with a hinged cover 192, whereby access can be had to the centralized means housed in the container for adjustment and other purposes. The centralized means that is housed in the container 191 and the connections between said means and the spools 130 in the head stock and 177 in the aprons is diagrammatically illustrated in Fig. 21.

The centralized means or control device for selecting or preselecting the spindle speeds and rates of feeding movements of the slides comprises three selector units indicated in Fig. 21 generally by the numbers 193, 194 and 195, the first two selector units 193 and 194 being for the purpose of selecting or preselecting the rates of feeding movement of the slides, while the unit 195 selects or preselects the spindle speeds. The three selector units which will later be described in detail are mounted on a rotatable shaft 196 arranged in the container 191. It will be understood if it is desired to control the spindle speeds only that the units 193 and 194, together with their operative connections to the gearing in the aprons might be omitted and only the unit 195 employed.

The unit 193 is provided with a bevel gear 197 that meshes with a bevel gear 198 mounted on a rotatable sleeve 199 supported on the front of the head stock. The selector unit 194 is provided with a bevel gear 200 which meshes with a bevel pinion 201 fixed on the upper end of a shaft 202 that is rotatably arranged in the sleeve 199 for independent rotation. The lower end of the shaft 202 projects below the lower end of the sleeve 199 and has fixed thereto a gear 203, while the lower end of the sleeve just above the gear 203 has fixed to it a gear 204. The gear 203 on the lower end of the shaft 202 meshes with a similar gear 205 fixed on a sleeve 206 that is also rotatably supported on the front of the head stock. The gear 204 meshes with a similar gear 207 that is fixed to the upper end of a shaft 208 mounted in the sleeve 206 for rotation independently thereof. The lower end of the sleeve 206 is provided with a bevel gear 209 that meshes with a bevel gear 210 fixed to a sleeve 211 that is rotatably supported in a bracket on the front of the bed and extends horizontally thereof and parallel with the ways 41. A sleeve 212 telescopes within the sleeve 211 and has a driving relation therewith through the medium of a key and keyway, it being noted by reference to Fig. 1 that the sleeve 212 is carried by a lug on the housing 175 to move with the apron 47. The sleeve 212 has fixed to its right hand end, as viewed in Fig. 21, a gear 213 which meshes with a gear 214 fixed on the outer end of the shaft 176 that is rotatably mounted in the housing 175 fastened to the apron 47, it being remembered that the spools 177 are mounted on the shaft 176 for rotation therewith and movement endwise thereof. It will be seen that when the cross slide carriage is given a longitudinal movement along the ways 41 the sleeve 212 will telescope within the sleeve 211 while its driving relation will be retained. It will also be seen that when the gear 200 of the selector unit 194 rotates, that through the shafts, gearing and sleeves, as already described, the shaft 176 and spools 177 in the apron 47 will be given a corresponding rotative movement.

The lower end of the shaft 208 in the sleeve 206 extends below said sleeve and has fixed thereto a bevel gear 215 which meshes with a similar bevel gear 216 that is fixed to the left hand end of a shaft 217 that extends through the sleeves 211 and 212 and is rotatable independently thereof, said shaft 217 being rotatably supported in the sleeve 212 and in suitable bearings on the front of the bed.

The shaft 217 near its right hand end, as viewed in Fig. 21, is provided with a sleeve 218 that is splined to and rotates with the shaft but can slide axially thereon. The sleeve 218 is carried by the apron 48 and is provided with a gear 219 that is constantly in mesh with a gear 220 fixed to the shaft 176 that is mounted in the apron 48 of the turret saddle, wherefore it will be seen that when the gear 197 of the selector unit 193 is rotated said shaft 176 and the spools 177 mounted thereon and located in the housing 175 that is attached to the end wall of the apron 48 of the turret saddle will be given a similar rotative movement. In this connection it will be noted that the gearing between the selector units and the shafts 176 is so arranged that for every complete revolution of the selector units a complete revolution will be imparted to the spools 177 in both the aprons 47 and 48.

The selector unit 195 is provided with a gear 221 which meshes with an idler gear 222 mounted on a stub shaft carried by the container 191, said idler gear 222, in turn, meshing with a similar gear 223 fixed to the shaft 131 that is rotatably supported in the cover 86 of the head stock and upon which are mounted the spools 130. It will be seen that rotation of the selector unit 195 will cause a corresponding and equal rotation of the spools 130 in the same direction.

The shaft 196 is driven through the mechanism now to be described and which includes a one rotation clutch. The main drive shaft 50 is provided with an auxiliary pulley 224 carrying a belt not shown which drives a pulley 225 fixed to a short shaft 226 rotatably supported in a bearing boss 227 formed on a wall of the container 191, see Figs. 5 and 21. The shaft 226 may be driven by other suitable means than by the belt drive just described as, for example, by drive means independent of the main drive shaft. The pulley 225 is fixed to the outer end of the shaft 226 that extends into the interior of the container and has fixed on its inner end a gear 228. The gear 228 meshes with a gear 229 which is fixed to a short ratchet shaft 230 provided with an integral ratchet 231 and with a reduced inner portion 232 that constitutes a bearing portion and extends into a longitudinally extending bore in the shaft 196, see Fig. 2.

The shaft 196 at its left hand end, as viewed in Fig. 2, has fixed thereto a flange 233 which, in turn has secured by screws or other suitable means to its left hand face, as viewed in said Fig. 2, a pawl support 234 which is provided with an annular recess housing the ratchet 231, see Fig. 9. The pawl support 234 is cut away or slotted, as indicated at 235, and in said slot is pivotally mounted a pawl 236 that is normally urged by a spring 237 into engagement with the teeth of the ratchet 231. The pawl 236 is provided with an extension 238 projecting beyond the periphery of the member 234 and adapted to be engaged by an element later to be referred to and which acts to hold the pawl out of ratchet tooth engagement. It will be seen that when the pawl is in ratchet tooth engagement the rotation of the short ratchet shaft 230 will cause a rotation of the shaft 196 through the pawl support 234 and the flange 233. It will also be seen that when the pawl is held out of ratchet tooth engagement the short ratchet shaft 230 will be free to rotate independently of the shaft 196, at which time said shaft, of course will be standing still.

Inasmuch as the selector units 193, 194 and 195 on the shaft 196 are substantially identical in construction except for slight differences which will later be pointed out, it will only be necessary to describe in detail one of the selector units, and for this purpose the construction of the selector unit 193 will be explained.

The selector unit 193 comprises a pair of friction cones 239 and 240 mounted on the shaft 196. The friction cone 239 is keyed to the shaft 196 so as to have a sliding movement thereon, while the friction cone 240 is fixed to the shaft 196. A coil spring 241 is interposed between the shoulders on the friction cones 239 and 240 and acts to urge the cone 239 toward the left as viewed in Fig. 13.

The selector unit 193 also comprises a support for a plurality of selector disks later to be referred to and which support internally cooperates with the friction cones 239 and 240 so as to be frictionally rotated thereby upon rotation of the shaft 196. The support comprises a portion 242 on which the bevel gear 197 is formed. The other portion of the support is indicated at 243, and it will be noted that said portion and the portion 242 are provided with conical surfaces arranged in engagement with the conical surfaces of the friction cones 239 and 240. The portion 242 is provided with an annular flange 244 extending axially of the shaft 196 and having threaded engagement with a shorter annular flange 245 on the portion 243, wherefore it will be seen that when the two portions are secured together they form in effect a single support.

The annular space between the portions 242 and 243 that lies outwardly of the flanges 244 and 245 receives a plurality of selector disks now to be described. The selector disks mounted on the support of the unit 193 are illustrated in Fig. 14 and are indicated by the reference numeral 246. The disks 246 are provided, in this instance, with seven equally spaced peripheral radially extending slots 247, since the disks in this instance, are to be adjustably positioned on their support in any one of seven different positions, six of which represent different rates of feeding movement of the cross slide carriage and the seventh position being a neutral one.

The disks 246 are provided with a central opening of such size that the disks can be slipped onto the flange 244 of the support portion 242 before the flange 245 of the portion 243 of the support has been threadedly connected to the flange 244, and when so positioned can rotate on the flange relative to the support so that the various disks can be adjusted to any one of the seven different positions of adjustment.

The unit 193, as clearly indicated in Figs. 2 and 13, is provided, in this instance, with six selector disks corresponding to the number of operative steps in a complete work cycle of the machine, and each of these disks can be adjusted so that the abutting lug 248 thereof will be in a predetermined position on the support. The disks 246 are held and locked in adjusted positions on the support so as to rotate as a unit therewith by means of a key 249 which is provided at one end with a fork straddling a pin 250 located in a slot formed in the portion 243 of the support. The key 249 adjacent its opposite end is provided in one edge with a notch 251. When the key is operatively positioned it will extend through the aligned slots 247 of the six selector disks 246 and into a milled-out recess 252 formed in the portion 242 of the support. When the key is thus positioned the notch 251 will be in alignment with a circular groove formed in the outer periphery of the portion 242 of the support and a split wire lock ring 253 located in said groove can be slid around to hold the key in position. The manner in which the split wire ring functions is clearly shown in Fig. 2, the ring on the unit 193 being shown positioned so that the key 249 can be withdrawn or inserted, as the case may be, in the slots of the selector disks while the split wire rings of the units 194 and 195 are shown positioned so as to hold the keys in engagement in the slots of the selector disks. The portion 243 of the support of the unit 193 is also provided on its periphery with an outwardly extending abutting lug 254 arranged adjacent to the slot in which the pin 250 for the key is located.

The unit 194 is identical with the unit 193 except for the fact that the portion 243 of the support of the unit 194 is provided with the gear 200. The unit 195 is identical with the unit 193 except that the portion 242 of the support of the unit 195 is provided on its periphery with a spur gear 221, as distinguished from the bevel gear 197.

The selector disks 255 mounted on the support of the unit 195 are provided with thirteen slots 256 corresponding to the slots 247 of the previously described selector disks. The selector disks of the unit 195 are illustrated in Fig. 15 and are also provided with abutting lugs 257 corresponding to the abutting lugs 248 of the disks 246. Inasmuch as the selector unit 195 functions, in this instance, to select or preselect any one of twelve spindle speeds, it is necessary to provide the disks 255 with thirteen notches 256 corresponding to these twelve spindle speeds and to a neutral position when the front two-step gear cone is disengaged from the gears on the spindle for purposes of loading or unloading a work piece on the spindle.

The peripheries of the portions 243 of the support for the units 193 and 194 are provided in predetermined circumferential locations with indicia representing rates of feeding movement of the cross slide carriage and of the turret saddle in relation to spindle speeds, while the periphery of the portion 243 of the support of the unit 195 is similarly provided with indicia representing the R. P. M. of the twelve different spindle speeds. The lugs 254 on all of the portions 243 of the supports of all of the units are provided with the letter N, indicating the neutral or inactive position.

The lugs 248 of the disks 246 of the units 193 and 194 and the lugs 257 of the disks 255 of the unit 195 as well as the lugs 254 of all of the units are adapted to cooperate with upstanding abutting arms 258 integrally formed on a sleeve 259. The sleeve 259 is provided at its right hand half with a plain bore and at its left hand half with a threaded bore and is mounted on a shaft 260 rotatably supported in certain of the walls of the container 191 and provided with a portion having a steep pitch thread 261 which cooperates with the threaded bore portion in the sleeve 259, see Figs. 2 and 3. The sleeve 259 is held against rotative movement by means of two downwardly extending arms 262 provided at their lower ends with openings through which extends a rod 263 which will later be referred to and which is mounted in a partition wall of the container against swinging movement, although it is capable of sliding movement for a purpose later to be explained.

It will be seen that when the shaft 260 is rotated the threaded portion 261 thereof will cause the sleeve 259 to move linearly according to the direction of rotation of the shaft 260. It is proposed to impart a step by step rotative movement to the shaft 260 so that the sleeve 259 will be shifted endwise step by step to position the upstanding abutting arms 258 relative to the lugs 254, 248 and 257 on the support portions 243 and the various disks 246 and 255, so as to be engaged by said lugs as the units 193, 194, 195 are rotated to stop the rotation of said units in predetermined positions for a purpose which will later be more fully explained. The step by step rotation of the shaft 260 is effected by means of a pawl and ratchet mechanism now to be described.

The shaft 260 to the left of the threaded portion 261, as viewed in Figs. 2 and 3, extends through a bearing boss formed in a partition wall of the container 191 and outwardly of said wall has fixed thereto a ratchet sleeve 264 provided with a ratchet 265, see Fig. 39. Freely rotatable on the sleeve 264 to the left of the ratchet 265 is a pawl support 266 which is provided with an extended portion on which is rockably mounted a pawl 267 normally held in ratchet tooth engaging position by means of a spring 268, see Fig. 10. A spring pressed retaining pawl 269 is rockably mounted on the partition in the container and normally held in ratchet tooth engaging position to prevent a reverse rotation of the ratchet and shaft 260. The ratchet support 266 is provided with an outwardly extending arm 270 to which is pivotally connected a link 271, the opposite end of which is pivotally connected to one end of a lever 272. A spring 273 surrounds a portion of the link 271 intermediate a collar 274 fixed to the link and an abutting plate 275 carried by the bearing boss in the partition of the container through which the shaft 196 extends. The lever 272 on the opposite side of its pivot point from the end to which the link 271 is connected is provided with a laterally bent end portion constituting a follower 276, that cooperates with a cam surface 277 formed on the under side of the left hand sleeve 127, as viewed in Figs. 5, 6, 7 and 8 for a purpose which will soon become apparent.

In Fig. 5 the follower 276 of the lever 272 is shown in a position wherein it is riding on the high point of the cam surface 277 of the sleeve 127, at which time the spring 273 is compressed and the relationship of the ratchet 265 and pawl 267 is as shown in Fig. 10. At this time the spools 130 are near their most outward position as shown in Fig. 19. When the spools 130 are moved inwardly toward each other by the equalized movement of the sleeves 127, the follower 276 is in the position shown in Fig. 6 and has ridden down to the low point of the cam surface 277 of the sleeve 127. When this occurs the spring 273 acts on the pawl support 266 to move the same in an anti-clockwise direction, as viewed in the drawings, to rock the lever 272 from the position shown in Fig. 5 to the position shown in Fig. 6. This movement of the pawl support 266 causes the pawl 267 to be moved from the position shown in Fig. 10 to the position shown in Fig. 11, the retainer pawl 269 holding the ratchet 265 against movement during this period. When the spools 130 are again moved outwardly the follower 276 rides upwardly on the cam surface 277 of the slide 127 from the position shown in Fig. 6 to the position shown in Fig. 5 and such movement of the follower 276 rocks the lever 272 and moves the link 271 against the tension of the spring 273 to move the pawl support 266 in a clockwise direction. This movement of the pawl support 266 in a clockwise direction causes, through the pawl 267, a clockwise indexing movement of the ratchet 265 and of the shaft 260 through one-seventh of a revolution as the ratchet is provided with seven teeth and the retaining pawl 269 will engage the next tooth as soon as it has passed to prevent reverse rotation of the ratchet.

It will be seen that the indexing rotation of the ratchet 265 and shaft 260 will cause the threaded portion 261 of the shaft to rotate one-seventh of a turn, with the result that the sleeve 259 will be shifted endwise a predetermined distance corresponding to the width of the selector disks 246 and 255. Therefore if the sleeve 259 is originally in the position shown in Fig. 2 with the abutting arms 258 engaged by the fixed lugs 254 on the portions 243 of the selector disk supports of the three selector units, six of these shifting or indexing movements will result in the sleeve 259 being moved endwise toward the right, as viewed in Fig. 2, to bring the abutting arms 258 into alignment with the lugs 248 and 251 of the most right hand selector disks of the selector units 193, 194 and 195, at which time the parts will be in the position shown in Fig. 3.

A rat trap spring 278 is mounted on the shaft 260 adjacent its most right hand end, as viewed in the drawings, and has one end secured to the shaft and its opposite end secured in the wall of the container 191, see Figs. 2 and 3, wherefore it will be apparent that the indexing rotation of the shaft 260, as just referred to, acts to build up increased tension in said spring 278 which, except for the restraining action of the retaining pawl 269, would cause a rotation of the shaft 260 and ratchet 265 in a direction opposite to the direction of its indexing movement.

The shaft 260 extends through the wall of the container 191 and has fixed to its extended end a dial 279 on the face of which are indicia indicating the starting or neutral position of the sleeve 259 and the six different operative positions to which it is indexed and corresponding to the number of operative steps in the complete work cycle in the present instance. The wall of the container 191 is provided with a pointer 280 that cooperates with the indicia on the face of the dial 279 and visually indicates to what position the sleeve 269 has been indexed and also the operative step in the work cycle, see Figs. 3 and 4.

The rod 263, as previously stated, is capable of sliding movement in its supports and is provided intermediate the arms 262 with a series of longitudinally spaced circular grooves 281 to enable a collar 282 to be adjustably positioned on the rod 263 in predetermined locations, see Fig. 2. The rod 263 is provided intermediate the left hand arm 262 and the boss on the intermediate partition of the container 191 through which the rod extends with a second collar 283 which is fixed to the rod. The end of the rod 263 beyond the intermediate wall of the container 191 is provided with a camming head 284 for a purpose which will now be explained.

It will be seen that when the parts are in the position shown in Fig. 2 the camming head 284 lies to the left and beyond the lower ends of the actuating pawl 267 and retaining pawl 269, see Fig. 10. Assuming that the parts are in the position shown in Fig. 2 and, as has already been stated, the sleeve 259 during a complete work cycle will be shifted or indexed endwise six steps from neutral position in which it is shown, it will be noted that the collar 282 is located in position over the last of the grooves 281 and consequently at the end of the sixth shifting movement of the sleeve 259 will be located in contact with the left hand arm 262 of the sleeve as clearly indicated in Fig. 3. Upon the commencement of the seventh indexing movement of the shaft 260 to shift the sleeve 259, it will be apparent that the left hand arm 262 since it is in engagement with the collar 282 will cause said collar and the rod 263 to be moved toward the right, with the result that the camming head 284 moves between the lower ends of the actuating pawl 267 and the retaining pawl 269 and rocks said pawls in a direction to disengage their teeth from the teeth of the ratchet 265, as shown in Fig. 12, wherefore the shaft 260 is free to be rotated in a direction reverse to its indexing rotation by the stored up tension in the rat-trap spring 278, and such rotation will cause the sleeve 259 to be shifted endwise toward the left to its former inactive or neutral position as shown in Fig. 2. Just prior to the sleeve 259 reaching its original or inactive position the left hand arm 262 will engage the collar 283 fixed to the rod 263 and cause said collar and rod to be shifted endwise toward the left, as viewed in the drawings, which movement results in the camming head 284 being shifted beyond the lower ends of the pawls 267 and 269, with the result that the pawl springs will move the pawl teeth into engagement with the ratchet 265.

The mechanism for placing the one rotation clutch in operation to rotate the shaft 196 to index the selector units will now be described. In addition to the cam surface 277 on the underside of the slide 127 said slide 127 is provided with a second cam surface 285 spaced longitudinally of the slide with respect to the cam surface 277 and located above the latter, as clearly indicated in Figs. 5 and 8. A lever 286 is rockably mounted in the container 191 intermediate the ends of the lever and on a downwardly extending bearing pin 287 carried by the container, and said lever has its right hand end, as viewed in the drawings, functioning as a follower on the side of the slide 127 and on the cam surface 285 thereof. The left hand end of the lever 286 in the active position of the lever extends over the extension 238 of the pawl 236, as clearly indicated in Figs. 6 and 9 and holds the tooth of said pawl out of engagement with the teeth of the continually rotating ratchet 231 of the one rotation clutch, at which time no rotation is imparted to the shaft 196 and the selector units mounted thereon.

When the spools are in their most inward position the levers 272 and 286 are in the position with reference to the cam surfaces 277 and 285, as indicated in Fig. 6. When the spools 130 are separated or moved outwardly to free the projections on their adjacent faces from the pins 115, 118 and 125, the cam surface 277 of the slide 127 is first brought into engagement with the end portion 276 of the lever 272 to rock said lever, and through the pawl and ratchet mechanism associated with the shaft 260, to impart an indexing rotation to said shaft and an indexing endwise shifting movement to the sleeve 259. At this time the spools have not yet been shifted to their most outward position although the projections on the spools are free of the pins. The further movement of the spools 130 to their most outward position causes the cam surface 285 of the slide 127 to move into engagement with the end or follower portion of the lever 286 to rock said lever and to cause its opposite end to move out of contact with the extension 238 of the pawl 236, whereupon the spring 237 moves the tooth of the pawl 236 into engagement with a tooth of the continuously rotating ratchet 231 of the one rotation clutch, with the result that the shaft 196 is rotated through the one rotation clutch and the selector units on said shaft are given an indexing or rotative movement until the stop lugs on the selector disks that are in alignment with the abutment arms 258 of the sleeve 259 engage the ends of said abutment arms, whereupon the further rotation of the selector units ceases, it being understood at this time that a slippage will occur between the supports of the selector units and the friction cones 239 and 240.

Cycle of operation

Assuming that the correct spindle speeds and the correct rates of feeding movements for the cross slide carriage and turret saddle have been determined for each of the operative steps in the complete work cycle, the operator sets up the control mechanism for selecting or preselecting the spindle speeds and the different rates of feeding movement in the different operative steps of the cycle in the following manner: He first drops the hinged cover 192 of the container 191 to obtain access to the selector units 193, 194 and 195 and to the other parts of the control means which must be moved to adjusted position.

The selector unit 195 for effecting the selection or preselection of the spindle speeds may be first adjusted by the operator in the following manner: The lock ring 253 is slid around until the space between its split ends allows the key 249 to be swung outwardly or removed, after which the selector disks 255 are rotatably moved individually on the body of the selector unit to bring the lugs 257 of the disks into approximate alignment with the numerals of the indicia on the support portion 243 of the body corresponding to the respective spindle speeds to be used in the various operative steps, it being assumed that in the present setup there will be six operative steps in a complete work cycle, and hence all six of the selector disks 255 will be separately adjusted in the manner just explained. After the disks have been adjusted, the key 249 is again positioned to hold all the disks of the unit in their adjusted location and the lock ring 253 is slid around to secure the key in position.

The operator in the same way adjusts the disks of the selector units 194 and 193 in accordance with the respective rates of feeding movement for the cross slide carriage and turret saddle in the various operative steps of the work cycle, it being remembered that the indicia on the support portions 243 of the selector units 194 and 193 represent such rates of feeding movements.

The operator next positions the collar 282 over the fifth or most right-hand groove 281 of the rod 263, since in this instance there are six operative steps in the complete cycle, it being recalled that no groove 281 is provided in the rod 263 for the first operative step, since no adjustment is required for merely one operative step. The control means for the selecting or preselecting units having thus been set up by the operator, the cover of the container 192 can now be closed and the machine is in condition for operation, during which the spindle speeds and rates of feeding movement for the cross slide carriage and turret saddle for each operative step in the work cycle will be automatically obtained through the movement of the main control lever 84. It will be remembered that when the selector units are in the neutral position, the front two-step gear cone is disconnected from the spindle and the spindle drive.

Assuming that a work piece is mounted in the chuck of the work spindle and the proper tools have been positioned on the cross slide and the turret and the parts of the control means are in the position shown in Fig. 2, with the abutting arms 258 in alignment with the neutral lugs on the supporting portions 243 of the selector units while the main control lever 84 is in the lower full line neutral position of Fig. 16, which position corresponds to position N of Fig. 36, the operator first moves said control lever vertically upwardly to position A of Fig. 36 to move the spools outwardly from the position shown in Fig. 18 to the position shown in Fig. 19, during which movement of the spools the slide 127 travels from the position shown in Fig. 6 to the position shown in Fig. 5 and during said travel of the slide the lever 272 is rocked to move from the position shown in Fig. 11 to the position shown in Fig. 10, such movement of said mechanism imparting an indexing rotation to the shaft 260 to move the sleeve 259 toward the right to position the abutting arms 258 in line with the lugs of the first disks of the three selector units. At this time the main control lever 84 is in the lower of the two dash line positions of Fig. 16 or in position A of Fig. 36 and the spools 131 have not yet reached their most outward position but are free of the pins 115, 118 and 125.

The operator continues the vertical upward movement of the main control lever 84 to the upper dash line position of Fig. 16 or to position B of Fig. 36, and such continued upward movement compresses the spring 288 which acts on the plunger 289 (see Fig. 16) as well as causes a further outward movement of the spools 131 to their most outward position. This further outward movement of the spools 131 causes the slide 127 to move from the position shown in Fig. 5 to the position shown in Fig. 7, with the result that the lever 286, due to the cam surface 285, is rocked away from the extended end 238 of the pawl 236 to allow the latter to interengage with the ratchet 231 of the one rotation clutch, whereupon an indexing rotation is imparted to the shaft 196 through a complete revolution, it being remembered, however, that when the lugs on the first selector disk of each of the three selector units abuts with its respective abutting arm 258 further rotation of the selector units ceases, even though the shaft 196 continues to rotate, it being recalled that there is provision for friction slippage between the units and the shaft. It will be understood that when the operator has moved the main control lever 84 vertically upwardly to the upper dash line position of Fig. 16 or to position B of Fig. 36, he then releases said lever and the tension stored up in the spring 289 moves the lever vertically downwardly to the lower dash line position of Fig. 16 or to position A of Fig. 36, while during such movement the spools 131 move partially toward each other while the slide 127 moves from the position shown in Fig. 7 to the position shown in Fig. 5, at which time the end of the lever 286 is in position to be engaged by the extended portion 238 of the pawl 236 to cause said pawl to be rocked out of engagement with the ratchet of the one rotation clutch. It will be understood that before the operator moves the main control lever 84 vertically upwardly to cause an outward movement of the spools 130 in the head stock, the spools carried by the aprons of the cross slide carriage and turret saddle are already in such outward position due to the disengagement of both control levers 168 and 174.

The indexing rotation of the selector unit 195 which has just been explained acts through the gears 221, 222 and 223 to impart an indexing rotation to the spools 130, so that when said spools are again brought to their most inward position certain of the cooperating pairs of projections on their adjacent faces will engage with the pins located therebetween to effect a predetermined shifting of the gears in the head stock gear train. It will be remembered that the gearing between the selector units and the spools with which they are operatively associated is such as to have a one-to-one ratio, wherefore the spools will be rotated in amounts equal to the rotation of the selector units.

Similarly, the indexing rotation of the selector unit 193 acts, through the gears 197, 198, sleeve 199, gears 204, 207, shaft 208, gears 215, 216, shaft 217 and gears 219 and 220 to impart an indexing rotation to the spools 177 associated with the apron of the turret saddle, wherefore said spools 177 will be indexed correspondingly to the indexing movement of the selector unit 193. The indexing movement of the selector unit 194 previously described acts, through the gears 200, 201, shaft 202, gears 203, 205, sleeve 206, gears 209, 210, telescopic sleeves 211, 212 and gears 213 and 214 to impart an indexing rotation to the spools 177 associated with the apron of the cross slide carriage and corresponding to the indexing rotation given to the selector unit 194.

From the foregoing it will be seen that the upward movement of the main control lever 84 has caused the spools in the head stock and in the aprons of the cross slide carriage and turret saddle to be indexed such that when said spools are brought inwardly to their most inward position they will effect a shifting of their respective associated gear trains to obtain a predetermined spindle speed and rates of feeding movement for the cross slide carriage and the turret saddle.

In order to move the spools 130 in the headstock from their most outward position to their most inward position to effect the shifting of the gear cones in the headstock, the operator first moves the main control lever 84 from the lower dotted line position to Fig. 16, or from position A of Fig. 36 horizontally to position D of Fig. 36, at which time the clutch members 82 and 83 are engaged and a slow rotative movement is being imparted to the gearing in the head stock, after which the operator moves the main control lever vertically downwardly from position D of Fig. 36 to position CF and this acts to move the spools 130 linearly of the shaft 131 toward each other to their most inward position and, as has already been stated, to effect a shifting of the gear cones in the headstock to obtain the predetermined spindle speed for the first operative step of the work cycle. The operator then moves the control lever 84 horizontally toward the left from position CF to position F of Fig. 36 to disengage the clutch members 82 and 83 to terminate the slow rotation of the gearing and to engage the clutch members 52 and 53 of the main driving clutch to initiate the normal working rotation of the gearing.

The spindle 45 is now rotating at the proper spindle speed for the operative steps, whereupon the operator may now position the cross slide carriage and the turret saddle in the correct location to bring the cutting tools carried by the cross slide and by the turret into proximity with the work piece carried by the spindle 45, after which he may manually move the control levers 168 and/or 174 from their inactive or lower position, as indicated in dash lines in Fig. 23, to their upper or feed engaging position to cause the spools 177 to move linearly inwardly toward each other to effect a shifting of the gear cones in the aprons 47 and/or 48 as well as on the last part of the movement of the feed control levers to engage the clutches for imparting feeding movement to the cross slide carriage and to the turret saddle. The feeding movement continues until the levers 168 and/or 174 are released, either by being automatically tripped or manually disengaged as the case may be, whereupon the feeding movements cease and the spools 177 are again in their most outward positions.

The feeding movement for the first operative step having now been completed the operator moves the cross slide carriage and/or the turret saddle away from the work piece and indexes the turrets, after which he may preselect the spindle speed and the rate of feeding movements for the next operative step in the cycle or he may disengage the main driving clutch and select the spindle speed and rates of feeding movement for the next operative step. If the operator preselects the spindle speed and rates of feeding movement for the next operative step he moves the main control lever 84 from position F of Fig. 37 to position E to cause the spools 130 to move outwardly, as well as to cause an indexing movement to be imparted to the sleeve 259 and to the abutting arms 258. This movement of the main control lever is continued vertically upwardly to position momentarily the same in position G of Fig. 37, which moves the spools 130 to their most outward position and also causes an indexing movement to be imparted to the selector units 193, 194 and 195 and to the spools 130 and the spools 177 in the aprons of the cross slide carriage and turret saddle. The main control lever 84 is then returned to position E and thence moved horizontally toward the right to position K of Fig. 37 to cause the main driving clutch to be disengaged and the clutch members 82, 83 to be engaged to impart a relatively slow rotative movement to the change speed gearing in the head stock, after which the control lever 84 is moved vertically downwardly from position K to position CF of Fig. 37 to cause the spools 130 to move to their most inward position to effect a shifting of the gear cones in the head stock to obtain the predetermined and preselected speed for the second or next operative step in the cycle. When this has occurred the operator moves the main control lever 84 from position CF to position F of Fig. 37 in a horizontal direction toward the left and such movement causes the clutch members 82 and 83 to be disengaged to stop the slow rotative movement of the change speed gearing while the main driving clutch is engaged to impart to said gearing a normal working rotative speed in a forward direction. The work spindle is now rotating at the preselected speed for the second operative step of the work cycle, so that the operator can position the cross slide carriage and the turret saddle properly to bring the cutting tools into the correct proximity to the work piece and again by manipulation of the feed control levers 168 and 174 cause the spools 177 in the aprons to be brought inwardly to shift the feed gear trains to obtain the preselected rates of feeding movement and to cause the feed clutches to be engaged to initiate the feeding movement. This procedure can be followed for each of the remaining operative steps in the work cycle.

Assuming that the feeding movements of the cross slide carriage and turret saddle for the first operative step of the cycle have terminated and the feed control levers 168 and 174 have been automatically or manually released and are in their lowermost position, the operator can continue the operation of the machine and select, as distinguished from preselect, the spindle speeds and rates of feeding movement for the subsequent operative steps in the following manner: He will first move the main control lever 84 from position F horizontally toward the right through position CF to position N of Fig. 38 to cause a disengagement of both the main driving clutch and the clutch members 82 and 83, at which time the work spindle and the gearing in the head-stock are at rest. The operator may then move the main control lever 84 vertically upwardly from position N first to position A of Fig. 38 to cause the spools 130 to move outwardly and the sleeve 259 to be indexed linearly toward the right, after which the vertical upward movement of the control lever 84 is continued to position B of Fig. 38 and then said control lever immediately returns to position A. The movement of the lever to position B, as has been explained, causes the spools to move to their most outward position, as well as causes the selector units and the spools to be relatively indexed. The operator then moves the main control lever from position A horizontally toward the left to position D to effect an engagement of the clutch members 82, 83 to cause the gearing in the headstock to slowly rotate, whereupon he moves the main control lever vertically downwardly from position D to position CF of Fig. 38 to cause the spools in the head stock to move inwardly to effect a shifting of the gear cones to obtain the selected speed and then he moves the control lever horizontally toward the left from position CF to position F of Fig. 38 to disengage the clutch members 82, 83 and to engage the main driving clutch, so that the gearing will be rotating at a normal working speed in a forward direction. The work spindle is now rotating at the proper or desired speed for the current operative step of the cycle, so that the operator after positioning the cross slide carriage and the turret saddle to bring the tools into proximity with the work piece can again effect a shifting of the gearing in the aprons and start the feeding movement at the selected rate by moving the feed control levers 168 and 174 into feed engaging position.

It will be noted from Figs. 36, 37 and 38 that, when it is desired to select or preselect the spindle speeds for reverse rotation of the spindle, the control lever 84 is given similar movements but in a right hand manner. For example, when the spindle is operating in a reverse direction and it is desired to preselect another reverse spindle speed, the control lever is moved upwardly from position R, as shown in Fig. 37, to position H, at which time the spools are moved outwardly and the sleeve 259 is indexed or shifted. When the control lever is now moved from position H to position I the selecting units and the spools are indexed. After the lever is moved from position I to position H, it will be moved to position L to initiate the slow power drive or crawl speed. During the movement of the lever from position L to position CR the spools are moved inwardly and the gear cones are shifted to obtain the newly selected speed. Returning the lever from position CR to position R will disengage the slow power drive or crawl speed and engage the main driving clutch to drive the spindle in a reverse direction.

As before stated the control lever 84 is raised to the lower dotted line position as shown in Fig. 16 after the completion of each step in the work cycle in order to move the spools 130 outwardly to be free of the pins 115, 118 and 125 and to move the sleeve 127 to rock the lever 272 to index or shift the sleeve 259 to a position to bring its three abutting arms 258 in line with the next disk of each selecting unit. After this indexing or shifting movement of the sleeve 259, the control lever is raised from the lower dotted line position to the upper dotted line position of Fig. 16, at which time the shaft 196, the selector units and the spools are indexed as explained above.

During the shifting movements of the sleeve 259, above referred to, the arms 262 forming part of the sleeve have been shifted along the rod 263, and the sixth shifting movement given to the sleeve at the end of the fifth step in the work cycle has positioned the left arm 262 alongside the collar 282 which, as before stated, was locked to the rod 263 with the point of its screw in the fifth groove 281 (see Figs. 2 and 3). It will be noted that during the step by step rotating movement of the shaft 260, the spring 278 was given an increased tension.

During the last or sixth step in the work cycle or when the work cycle is completed, the operator will preselect or select the neutral position of the selector units as indicated by the letter N on said units, in order that the front two step gear cone may be shifted to a position in which it is disengaged from the spindle and spindle drive. He will move the control lever first to neutral position and then give said lever an upward movement from position N to position A as shown in Fig. 36. During this upward movement of the control lever the sleeve 259 will again be given a shifting movement to the right, as viewed in Fig. 3, but, due to the arm 262 which is positioned alongside the collar 282, the shifting movement of the sleeve and arm will move the rod 263, and its camming head 284 will move both the actuating pawl 267 and the retaining pawl 269 outwardly, thus freeing the shaft 260, and the spring 278 will rotate the shaft in the opposite direction, thus restoring the sleeve 259 and the rod 263 to their former positions, as indicated in Fig. 2. When the control lever is now raised from position A to position B, as shown in Fig. 36, the shaft 196, the selecting units and the spools will be indexed and said units will come to rest with the neutral abutting lug 254 of each unit in contact with the abutting arm 258, and the selecting units will again be restored to their former positions as indicated in Fig. 2.

It will be remembered that the spools 130 are provided with projections of equal length for shifting the front two-step gear cone to an inactive or neutral position, that is, in a position intermediate the gears 75 and 76. Therefore, the operator will move the lever downwardly from position A to position N, as shown in Fig. 36 and thus shift the front two-step gear cone to its neutral position. With the gear cone in this position the work spindle 45 is disconnected from the gear drive and may be freely rotated by hand for the purpose of unloading and loading the work pieces. After the new work piece is loaded on the spindle the operator will start the first step of a new work cycle.

Thus it will be seen that with the mechanism which I have provided the objects of the invention stated in the early part of the specification are attained very effectively for either selecting or preselecting the spindle speed and the rate of feeding movement of the tool carrying members. However, I do not desire to be confined to the precise mechanism herein illustrated and described as various changes may be made without departing from the invention in its numerous aspects. I therefore aim in my claims to cover all modifications which do not involve a departure from the spirit and scope of the invention as defined in the appended claims.

Having thus described my invention, I claim:

1. In a machine tool, a plurality of members movable at varying rates, a variable speed transmission for moving each of said members, and a centralized means operatively associated with all of said transmissions for selecting or preselecting the rates of movement for all of said movable members.

2. In a machine tool, a plurality of members movable at varying rates, a variable speed transmission for each of said members, centralized means operatively associated with all of said transmissions for selecting or preselecting the rates of movement for all of said movable members, a manual control member operatively associated with each transmission and actuatable to obtain the selected or preselected rates of movement, one of said control members also controlling said centralized means.

3. In a machine tool, a plurality of members movable at varying rates for each step of a work cycle, a transmission for moving each of said members, and centralized means operatively associated with all of said transmissions for selecting or preselecting the rates of movement for all of said members for each step in the work cycle.

4. In a machine tool, a work carrying member and a tool holding member each movable at varying rates, a variable speed transmission for moving each of said members, and centralized means operatively associated with all of said transmissions for selecting or preselecting the rates of movement of both of said members.

5. In a machine tool, a pair of movable members for supporting respectively the work and a tool and including a member having a rotating movement and a member having a sliding movement and both movable at varying rates, a variable speed transmission for moving each of said members, and centralized means operatively associated with all of said transmissions for selecting or preselecting the rates of movement for both of said members.

6. In a machine tool, a plurality of members movable at varying rates and including a work carrying spindle having a rotary movement and a tool holding member having a sliding movement, a variable speed transmission for moving each of said members, and centralized means operatively associated with all of said transmissions for selecting or preselecting the rates of movement for all of said movable members.

7. In a machine tool, a plurality of members movable at varying rates and including a member having rotary movement and a pair of members each having sliding movement, a variable speed transmission for moving each of said members, and centralized means operatively associated with all of said transmissions for selecting or preselecting the rates of movement for all of said movable members.

8. In a machine tool, a plurality of members movable at varying rates, a variable speed transmission for moving each of said members, a manual control member for each of said transmissions, and centralized means operatively associated with all of said transmissions and including a power actuated member for selecting or preselecting the rates of movement of all of said movable members, one of said manual control members serving to control said power actuated member.

9. In a machine tool, a plurality of members movable at varying rates one having a rotating movement and another a sliding movement, a variable speed transmission for moving each of said members, a manual control member for each of said transmissions, and centralized means operatively associated with all of said transmissions and including a power actuated member for selecting or preselecting the rates of movement of all of said movable members, the control member for the member having rotating movement serving also to control said power actuated member.

10. In a machine tool, a plurality of members movable at varying rates, each of said members having a variable speed transmission for moving the same, centralized means operatively associated with all of said transmissions for selecting or preselecting the rates of movement for all of said movable members, and a manual control member for each of said transmissions and serving when actuated to obtain the selected or preselected speed for the corresponding movable member.

11. In a machine tool, a plurality of members movable at varying rates, each of said members having a variable speed transmission for moving the same, centralized means operatively associated with all of said transmissions and including a power actuated member for selecting or preselecting the rates of movement for all of said movable members, a manual control member for each of said transmissions and serving when actuated to obtain the selected or preselected speed for the corresponding movable member and one of said control members serving also to control said power actuated member.

12. In a machine tool, a plurality of members movable at varying rates, each of said members having a variable speed transmission for moving the same, actuating devices associated with each of said transmissions, centralized means for moving said devices in one direction for selecting or preselecting the rates of movement for all of said movable members, and separate control members for said movable members and serving to further move said devices to obtain the selected or preselected rate of movement for said movable members.

13. In a machine tool, a plurality of members movable at varying rates, a variable speed transmission for moving each of said members, and a centralized means operatively associated with all of said transmissions and for selecting or preselecting the rates of movement for all of said movable members, said centralized means including a selecting unit for each of said movable members and power means for indexing said selecting units simultaneously.

14. In a machine tool, a plurality of members movable at varying rates, a variable speed transmission for moving each of said members, and a centralized means for selecting or preselecting the rates of movement for all of said movable members, said centralized means including a plurality of selecting units each operatively connected to one of said transmissions and each of said units being composed of a plurality of members relatively adjustable with respect to each other.

15. In a machine tool, a plurality of members movable at varying rates, each of said members having a variable speed transmission for moving the same, centralized means operatively associated with all of said transmissions for selecting or preselecting the rates of movement for all of said movable members, a manual control member for each of said transmissions and serving when actuated to obtain the selected or preselected speed for the corresponding movable member, and means comprising a slow power drive associated with the variable speed transmission for one of said movable members.

16. In a machine tool, a plurality of members movable at varying rates, a variable speed transmission for moving each of said members, means comprising pairs of rotatable and slidable devices operatively associated with each of said transmissions, a centralized means for selecting or preselecting the rates of movement for all of said movable members and including selecting units each geared to one of said pairs of devices for rotating the same for selecting or preselecting rates of movement for said movable members, and control members each operatively associated with one of said movable members and operatively connected with the corresponding pair of devices to actuate the devices of such pair to obtain the selected or preselected rate of movement.

17. In a machine tool, a plurality of members movable at varying rates, a variable speed transmission for moving each of said members, means comprising pairs of spools operatively associated with each of said transmissions, a centralized means for selecting or preselecting the rates of movement for all of said movable members and including selecting units each geared to one of said pairs of spools for indexing the same for selecting or preselecting a rate of movement for said movable members, and control members each operatively associated with one of said movable members and operatively connected with the corresponding pair of spools to actuate the spools of such pair to obtain the selected or preselected rate of movement.

18. In a machine tool, a plurality of members movable at varying rates, variable speed transmissions for moving said members each including a clutch, centralized means operatively associated with all of said transmissions for selecting or preselecting the rates of movement for all of said movable members, a manual control member operatively connected with each of said transmissions for obtaining the selected or preselected rate of movement and arranged to actuate the clutch associated therewith.

19. In a machine tool, a plurality of members movable at varying rates, a variable speed transmission including a clutch for each of said members, means comprising pairs of rotatable and slidable spools operatively associated with each of said transmissions, centralized means for selecting or preselecting the rates of movement for all of said movable members and including selector units each geared to one of said pairs of spools for rotating the same for selecting or preselecting rates of movement for said movable members, and a control member operatively associated with each of said movable members and operatively connected with the corresponding pair of spools to actuate the same so as to obtain the selected or preselected rate of movement, each of said control members serving to actuate the corresponding clutch.

20. In a machine tool, a plurality of members movable at varying rates, a separate variable speed transmission including a clutch for each of said members, one of said transmissions providing forward and reverse movements for the associated movable member, centralized means for selecting or preselecting the rates of movement for all of said movable members, and a manual control member operatively associated with each of said transmissions for obtaining the selected or preselected rate of movement and serving to actuate the corresponding clutch, one of said control members controlling said forward and reverse movement for one of said movable members.

21. In a machine tool, a plurality of members movable at varying rates, a variable speed transmission for moving each of said members, a control lever for one of said transmissions, and a centralized means operatively associated with all of said transmissions and with said control lever and functioning automatically upon movement of said control lever to select or preselect the rates of movement for all of said movable members.

22. In a machine tool, a plurality of members movable at varying rates for the different steps of a work cycle, a variable speed transmission for moving each of said members, a control lever for one of said transmissions, and centralized means operatively associated with all of said transmissions and with said control lever and functioning automatically upon movement of the latter to select or preselect the rates of movement for all of said members successively for each step throughout the work cycle.

23. In a machine tool, a plurality of members movable at different rates during the different steps of a work cycle, a variable speed transmission for moving each of said members, a control lever for one of said transmissions, and centralized means operatively associated with all of said transmissions and said control lever and including indexible mechanism and means for effecting automatic indexing movement of said mechanism upon movement of said control lever to select or preselect the different rates of movement for all of said members for each step of the work cycle.

24. In a machine tool, a plurality of members movable at varying rates, a variable speed transmission for moving each of said members, and a centralized means operatively associated with all of said transmissions for selecting or preselecting the rates of movement for all of said movable members, said centralized means including a selecting unit for each of said movable members, and means for indexing said selecting units simultaneously.

25. In a machine tool, a plurality of members movable at varying rates, each of said members having a variable speed transmission for moving the same, centralized means operatively associated with all of said transmissions for selecting or preselecting the rates of movement for all of said movable members, a manual control member for each of said transmissions and serving when actuated to obtain the selected or preselected speed for the corresponding movable members, and means for imparting a slow power drive to said transmissions to facilitate the obtainance of the selected or preselected rates of movement for said movable members.

26. In a machine tool, a plurality of members movable at varying rates, a variable speed transmission for moving each of said members, means comprising a rotatable and slidable device operatively associated with each of said transmissions, a centralized means for selecting or preselecting the rates of movement for all of said movable members and including selecting units each operatively associated with one of said devices for rotating the same for selecting or preselecting the rates of movement for said movable members, and control members each associated with one of said transmissions and operatively connected with the corresponding device to actuate said device to obtain the selected or preselected rate of movement.

27. In a machine tool, a plurality of members movable at varying rates, a variable speed transmission including a clutch for each of said members, means comprising an indexible and movable device operatively associated with each of said transmissions, centralized means for indexing all of said devices for selecting or preselecting rates of movement for said movable members, and a control member operatively associated with each of said transmissions and operatively connected with the corresponding device to move the same so as to obtain the selected or preselected rate of movement, each of said control members serving to actuate the corresponding clutch.

28. In a machine tool, a member movable at varying rates, a variable speed transmission for moving said member, means for selecting or preselecting the different rates of movement of said member and including a selecting unit comprising an indexible support, a plurality of disks adjustably mounted on said support and provided with abutting portions, and means for locking said disks in adjusted position on said support with the abutting portions of said disks circumferentially spaced in predetermined positions and correlated to the different rates of movement to be imparted to said movable member.

29. In a machine tool, a movable member, a variable speed transmission for moving said member at different rates, means operatively associated with said transmission and comprising a device indexible to select or preselect the different rates of movement for said member and movable to actuate said transmission to obtain the selected or preselected rate, and a selecting unit operatively associated with said device for indexing the same and including an indexible support, a plurality of adjustable selecting disks carried thereby, and means for locking said disks on said support in adjusted positions correlated to the different rates of movement for said movable member.

30. In a machine tool, a movable member, a variable speed transmission for moving said member at different rates for the different operative steps of a work cycle, means operatively associated with said transmission and including a device indexible to select or preselect the different rates of movement of said member and movable to actuate said transmission to obtain the selected or preselected rates, and a selector unit operatively associated with said device and comprising an indexible support, selector disks adjustably mounted thereon and corresponding in number to the operative steps of the work cycle, and means for locking said adjustable disks in predetermined positions on said support correlated to the different rates of movement of said movable member for the different operative steps of the work cycle.

31. In a machine tool, a plurality of movable members, change speed transmissions for moving each of said members at different rates, mechanisms operatively associated with each of said transmissions and indexible to select or preselect the different rates of movement for the respective members and movable to actuate the respective transmissions to obtain the selected or preselected rate, a centralized control device operatively associated with all of said mechanisms to simultaneously index all of said mechanisms, and separate manually operated means operatively associated with each of said mechanisms to independently move the same to obtain the selected or preselected rate.

32. In a machine tool having a plurality of members to be moved at different rates, separate means indexible for selecting or preselecting the different rates of movement for said members and movable to obtain the selected or preselected rate, individual control devices for indexing said last named means, and means for automatically and sequentially stopping movement of each of said control devices in various predetermined positions correlated to predetermined rates of movement for said members and including a single means provided with spaced stop portions each cooperating with one of said control devices, and means automatically operated to sequentially move said single means step by step to cause each of said stop portions to pass through a plurality of active positions and into an inactive position relative to its respective control device.

33. A control device for mechanism for selecting or preselecting the rates of movement of a movable part of a machine tool and comprising an indexible member operatively associated with said mechanism, means for indexing said member to various indexed positions and including adjustable abutting portions carried by said indexible member, a stop, means for moving said stop step by step to successively position the same in cooperative relationship with said abutting portions and including a rotatable camming member, means for imparting a step by step rotation to said camming member in one direction, means for urging said camming member in the opposite direction, latch means for resisting the action of said last named means, and means automatically controlled by the position of said stop for tripping said latch means to permit rotation of said camming member in the opposite direction to restore said stop to its initial position.

34. A control device for the mechanism for selecting or preselecting the rates of movement of a movable part of a machine tool which comprises an indexible support provided with a plurality of adjustable circumferentially and axially spaced abutting portions corresponding in number to the operative steps of the work cycle of the machine tool and correlated with respect to the rates of movement of the movable part for the different operative steps of said cycle, a rotatable shaft on which said support is mounted, a friction driving connection between said shaft and said support, a stop for cooperation with said abutting portions to hold said support stationary while said shaft rotates relative thereto, means for moving said stop with a step by step movement to successively bring the same into cooperation with said abutting portions, and means controlled by the position of said stop for restoring the same to its initial position upon the completion of the work cycle.

35. A control device for the mechanism for selecting or preselecting the rates of movement of a movable part of a machine tool and which comprises an indexible support operatively associated with said mechanism and provided with a plurality of circumferentially and axially spaced abutting portions corresponding in number to the operative steps of a work cycle and located in correlation to the rates of movement of said part for the different operative steps, means for rotating said support, stop means cooperating with said abutting portions for stopping the rotation of said support in predetermined positions, means for moving said stop means step by step into different active positions corresponding in number to the operative steps of the work cycle, and means controlled by the movement of said stop for returning the same to its initial position upon the completion of a work cycle and including an element adjustable into different positions related to the total number of operative steps in the work cycle.

36. In a machine tool, in combination, a member indexible to select or preselect the rate of movement of a movable part of a machine tool and movable to obtain the selected or preselected rate of movement, and a control device for said member and operatively connected therewith and including an indexible support provided with adjustable abutting portions spaced thereon in relation to the different rates of movement to be selected or preselected for said part, a stop for cooperation with said abutting portions, a screw for moving said stop, means for imparting a step by step rotation in one direction to said screw, operative connections between said means and said member such that movement of the latter actuates said means.

37. In a machine tool, in combination, a member indexible to select or preselect the different rates of movement of a movable part for the different operative steps of a work cycle and movable to obtain the selected or preselected rate, and a control unit for said member and comprising a shaft, means for rotating said shaft, a support carried by the shaft and provided with a plurality of adjustable circumferentially and axially spaced abutting portions, a friction driving connection between said shaft and said support, a stop cooperating with said abutting portions, rotatable means for moving said stop step by step into cooperative relative position with respect to said abutting portions, means controlling the operation of said shaft operating means, means for imparting a step by step rotation to said rotating means, and operative connections intermediate both of said last named means and said member and actuated by the movement of said member.

38. In a machine tool, in combination, a plurality of members indexible to select or preselect the different rates of movement of a corresponding number of movable parts for the different operative steps of a work cycle and movable to obtain the selected or preselected rate for each of said parts, and a centralized control unit for said members and comprising a shaft, means for rotating said shaft, a plurality of supports carried by said shaft and each support being operatively associated with a member respectively and provided with a plurality of adjustable circumferentially and axially spaced abutting portions, friction driving connections between said shaft and said supports, an element provided with a plurality of stops cooperating with the abutting portions of said supports, rotatable means for moving said element step by step to bring the stops carried thereby into cooperative relative position with respect to said abutting portions, means controlling the operation of said shaft operating means, means for imparting a step by step rotation to said rotating means, and operative connections intermediate both of said last named means and one of said members and actuated by the movement of said one member.

39. In a machine tool having a part movable at different rates, mechanism indexible to select or preselect said different rates of movement and movable to obtain the selected or preselected rates, and a control lever operatively associated with said mechanism for effecting said movement thereof; a control device in the form of a unit attachment and comprising means for indexing said mechanism, an operative connection between said means and said mechanism, power means for operating said means, means for connecting and disconnecting said power means to and from said first named means, and an operative connection between said last means and said control lever and including portions of said mechanism.

40. A control device in the form of a unit attachment which is adapted to be operatively associated with the indexible member or members of a mechanism for selecting or preselecting the different rates of movement of a movable part of a machine tool and comprising means operatively associated with said member or members and functioning to index the same, and presettable means for actuating said indexing means in predetermined increments to effect the selection or preselection of the different rates of movement of said movable part sequentially for the different operative steps of a work cycle.

41. In a machine tool, in combination, a member indexible to select or preselect the rate of movement of a movable part of a machine tool and movable to obtain the selected or preselected rate of movement, a manually operated lever for effecting movement of said member, and a control device for said member in the form of a unit attachment and including mechanism for indexing said member to predetermined positions, an operative connection between said mechanism and said member, means operating said mechanism, and an operative connection between said means and said manual lever whereby said lever controls said means.

JOHN J. N. VAN HAMERSVELD.